(12) United States Patent
Kubota et al.

(10) Patent No.: US 12,545,872 B2
(45) Date of Patent: Feb. 10, 2026

(54) CELL CULTURE METHOD, METHOD FOR PRODUCING CULTURE MEDIUM, CULTURE MEDIUM AND CULTURE DEVICE

(71) Applicant: CANON KABUSHIKI KAISHA, Tokyo (JP)

(72) Inventors: Masahiko Kubota, Tokyo (JP); Akira Yamamoto, Kanagawa (JP); Toshio Kashino, Kanagawa (JP); Teruo Ozaki, Kanagawa (JP); Hiroyuki Ishinaga, Tokyo (JP); Akitoshi Yamada, Kanagawa (JP); Yumi Yanai, Kanagawa (JP); Yoshiyuki Imanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 821 days.

(21) Appl. No.: 17/728,574

(22) Filed: Apr. 25, 2022

(65) Prior Publication Data
US 2022/0251487 A1    Aug. 11, 2022

Related U.S. Application Data

(63) Continuation of application No. PCT/JP2020/040961, filed on Oct. 30, 2020.

(30) Foreign Application Priority Data

Oct. 31, 2019    (JP) .................. 2019-199154
Oct. 26, 2020    (JP) .................. 2020-178848

(51) Int. Cl.
*C12M 3/00*    (2006.01)
*C12M 1/00*    (2006.01)
(Continued)

(52) U.S. Cl.
CPC ............ *C12M 21/08* (2013.01); *C12M 29/06* (2013.01); *C12M 29/26* (2013.01); *C12M 41/12* (2013.01);
(Continued)

(58) Field of Classification Search
CPC .......................... B01F 23/2373; C12M 21/08
See application file for complete search history.

(56) References Cited

U.S. PATENT DOCUMENTS 6,109,734 A * 8/2000 Kashino ................. B41J 2/055
                                                      347/92
8,740,450 B2   6/2014 Mogami et al.
(Continued)

FOREIGN PATENT DOCUMENTS

CN    104968607 A    10/2015
JP      4456176 B2     4/2010
(Continued)

OTHER PUBLICATIONS

First Office Action in Chinese Application No. 202080076658.4 (Jun. 2023).
(Continued)

*Primary Examiner* — Elizabeth Insler
(74) *Attorney, Agent, or Firm* — Venable LLP

(57) ABSTRACT

A large amount of three-dimensional cells are efficiently produced. To this end, a cell is cultured by using a culture medium containing an ultra-fine bubble generated by heating a heating element to make film boiling on an interface between a liquid W and the heating element.

10 Claims, 18 Drawing Sheets

(51) Int. Cl.
  *C12M 1/34* (2006.01)
  *C12N 5/074* (2010.01)
(52) U.S. Cl.
  CPC ........ *C12N 5/0696* (2013.01); *C12N 2500/05* (2013.01); *C12N 2500/32* (2013.01); *C12N 2500/38* (2013.01); *C12N 2513/00* (2013.01)

(56) References Cited

U.S. PATENT DOCUMENTS

| | | | |
|---|---|---|---|
| 9,908,089 | B2 | 3/2018 | Kim et al. |
| 11,179,652 | B2 | 11/2021 | Kubota et al. |
| 11,331,910 | B2 | 5/2022 | Arimizu et al. |
| 11,364,474 | B2 | 6/2022 | Ishinaga et al. |
| 11,369,926 | B2 | 6/2022 | Yanai et al. |
| 2015/0343399 | A1* | 12/2015 | Kim ............... B01F 35/718051 44/457 |
| 2019/0390150 | A1 | 12/2019 | Higuchi et al. |
| 2020/0171103 | A1 | 6/2020 | Shimizu |
| 2020/0197963 | A1 | 6/2020 | Takahashi et al. |
| 2020/0254468 | A1 | 8/2020 | Kubota et al. |
| 2020/0276511 | A1 | 9/2020 | Ozaki et al. |
| 2020/0276513 | A1 | 9/2020 | Yanai et al. |
| 2020/0276514 | A1 | 9/2020 | Ishinaga et al. |
| 2020/0276550 | A1 | 9/2020 | Imanaka et al. |
| 2020/0276804 | A1 | 9/2020 | Kubota et al. |
| 2020/0278111 | A1 | 9/2020 | Imanaka et al. |
| 2021/0129091 | A1 | 5/2021 | Yamada et al. |
| 2021/0129093 | A1 | 5/2021 | Yamamoto et al. |
| 2021/0245118 | A1 | 8/2021 | Yamada et al. |
| 2021/0379547 | A1 | 12/2021 | Yamada et al. |
| 2022/0241737 | A1 | 8/2022 | Kubota et al. |
| 2022/0250015 | A1 | 8/2022 | Kashino et al. |
| 2022/0258107 | A1 | 8/2022 | Ishinaga et al. |
| 2022/0288542 | A1 | 9/2022 | Kubota et al. |
| 2022/0323917 | A1 | 10/2022 | Kashino et al. |
| 2022/0331755 | A1 | 10/2022 | Shimoyama et al. |

FOREIGN PATENT DOCUMENTS

| | | |
|---|---|---|
| JP | 6118544 B2 | 4/2017 |
| JP | 2019-042732 A | 3/2019 |
| WO | 2018/139343 A1 | 8/2018 |
| WO | 2019/044913 A1 | 3/2019 |
| WO | 2019/168034 A1 | 9/2019 |
| WO | 2020/174867 A1 | 9/2020 |
| WO | 2021/085577 A1 | 5/2021 |
| WO | 2021/085579 A1 | 5/2021 |
| WO | 2021/085629 A1 | 5/2021 |
| WO | 2021/085637 A1 | 5/2021 |

OTHER PUBLICATIONS

Kashino et al., U.S. Appl. No. 17/732,686, filed Apr. 29, 2022.
Ishinaga et al., U.S. Appl. No. 17/732,663, filed Apr. 29, 2022.
Kubota et al., U.S. Appl. No. 17/726,237, filed Apr. 21, 2022.
Kubota et al., U.S. Appl. No. 17/686,654, filed Mar. 4, 2022.
Shimoyama et al., U.S. Appl. No. 17/690,248, filed Mar. 9, 2022.
Kashino et al., U.S. Appl. No. 17/690,261, filed Mar. 9, 2022.
International Search Report in International Application No. PCT/JP2020/040961 (Dec. 2020).
Kosuke Kusamori et al., "Development of Multicellular Spheroid for Cell-Based Therapy," 28-1 Drug Delivery System 45-53 (2013).

* cited by examiner

CELL CULTURE METHOD, METHOD FOR PRODUCING CULTURE MEDIUM, CULTURE MEDIUM AND CULTURE DEVICE

CROSS-REFERENCE TO RELATED APPLICATIONS

This application is a Continuation of International Patent Application No. PCT/JP2020/040961, filed Oct. 30, 2020, which claims the benefit of Japanese Patent Applications No. 2019-199154 filed Oct. 31, 2019, and No. 2020-178848 filed Oct. 26, 2020, all of which are hereby incorporated by reference herein in their entirety.

BACKGROUND OF THE INVENTION

Field of the Invention

The present invention relates to a cell culture method, a method for producing a culture medium, a culture medium, and a culture device.

Background Art

In the regenerative medicine field, three-dimensional cells such as spheroids and organoids that are produced by culturing a human cell have been considered promising. In the transplantation of the three-dimensional cells, cells form a scaffold structure once the transplantation is made in a predetermined part; for this reason, apoptosis occurs less than the transplantation of single cells or two-dimensional cells, and thus the high cell survival rate after the transplantation is an advantage thereof.

In recent years, spheroids and organoids have been utilized in a process of three-dimensional floating culture of ES cells that have pluripotency, ips cells that are pluripotent stem cells, and the like from an undifferentiated state and further differentiating and inducing. Additionally, such spheroids and organoids have been demanded to be reliably produced in a large amount while having a desired size and the stability for a long period of time. In "Development of multicellular spheroid for cell-based therapy" Drug Delivery System 28-1, P45-53, 2013, the utility and various producing methods of cell spheroids are disclosed.

CITATION LIST

Patent Literature

PTL 1: Japanese Patent No. 6118544
PTL 2: Japanese Patent No. 4456176

Non Patent Literature

NPL 1: "Development of multicellular spheroid for cell-based therapy" Drug Delivery System 28-1, P45-53, 2013

SUMMARY OF THE INVENTION

However, in a process of three-dimensional culture, there is a tendency that, once a three-dimensional cell reaches a certain size, a cell inside is not sufficiently supplied with oxygen and necrotizes (necrosis). For this reason, although there have been invented various culture methods, such necrosis has been bottleneck, and it has been difficult to efficiently produce a large amount of three-dimensional cells. Additionally, there have been demanded for not only the three-dimensional cells but also for two-dimensional cells to be further efficiently produced in a large amount.

The present invention is made in view of solving the above-described problems. Therefore, an object thereof is to provide a cell culture method, a method for producing a culture medium, a culture medium, and a culture device capable of efficiently producing a large amount of two-dimensional cells or three-dimensional cells.

To this end, the present invention is characterized by the culture of a cell using a culture medium containing ultra-fine bubbles generated by heating a heating element to make film boiling on an interface between a liquid and the heating element.

Further features of the present invention will become apparent from the following description of exemplary embodiments with reference to the attached drawings.

DESCRIPTION OF THE EMBODIMENTS

First Embodiment

Recent years, there have been developed techniques for applying the features of fine bubbles such as microbubbles in micrometer-size in diameter and nanobubbles in nanometer-size in diameter. Especially, the utility of an ultra-fine bubble (Ultra Fine Bubble; hereinafter also referred to as "UFB") smaller than 1.0 µm in diameter has been confirmed in various fields.

In Japanese Patent No. 6118544, a fine air bubble generating apparatus that generates fine bubbles by jetting a pressurized liquid in which a gas is pressurized and dissolved from a depressurizing nozzle is disclosed. Additionally, in Japanese Patent No. 4456176, an apparatus that generates fine bubbles by repeating diverging and converging of a gas mixed liquid by using a mixing unit is disclosed.

The utilization of such UFBs is also expected in the field of regenerative medicine. However, according to the studies by the present inventors, it has been confirmed that it is difficult for the UFBs generated by the methods disclosed in Japanese Patent No. 6118544 and Japanese Patent No. 4456176 to be stored for a long period of time.

<<Configuration of UFB Generating Apparatus>>

Figure 1:
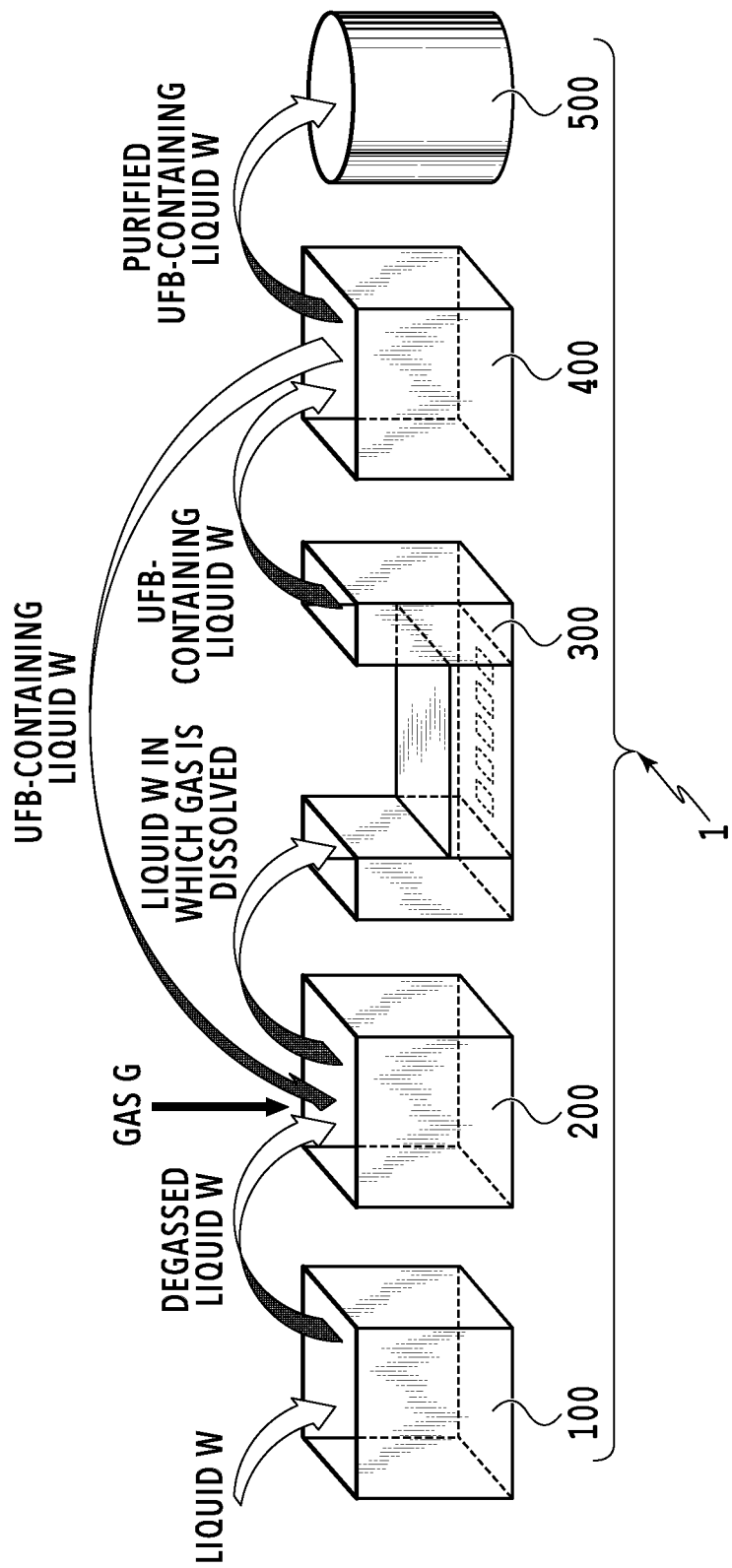
FIG. 1 is a diagram illustrating an example of a UFB generating apparatus.

FIG. 1 is a diagram illustrating an example of a UFB generating apparatus applicable to the present embodiment. A UFB generating apparatus 1 of this embodiment includes a pre-processing unit 100, dissolving unit 200, a T-UFB generating unit 300, a post-processing unit 400, and a collecting unit 500. Each unit performs unique processing on a liquid W such as tap water supplied to the pre-processing unit 100 in the above order, and the thus-processed liquid W is collected as a T-UFB-containing liquid by the collecting unit 500. Functions and configurations of the units are described below.

Figure 2:
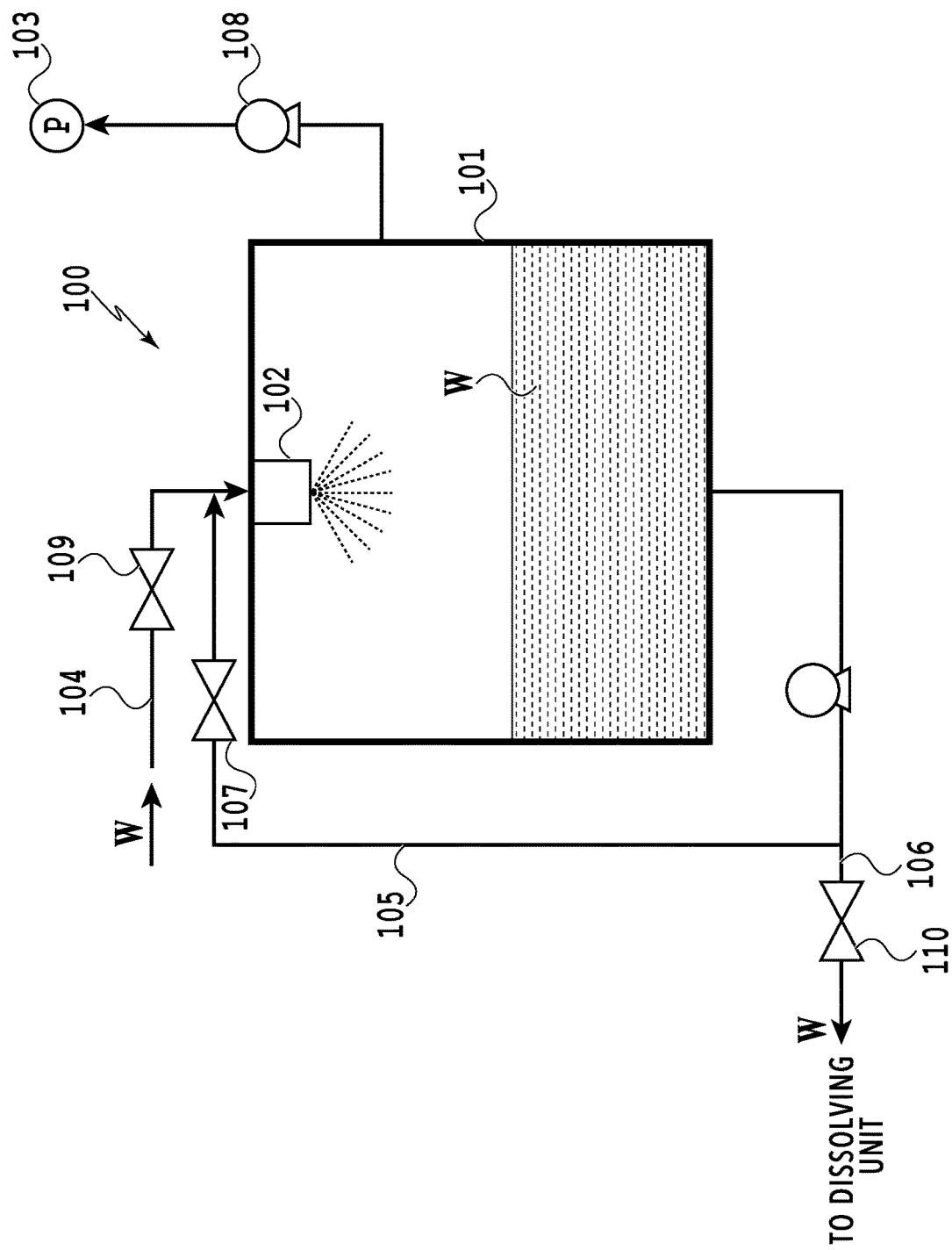
FIG. 2 is a schematic configuration diagram of a pre-processing unit.

FIG. 2 is a schematic configuration diagram of the pre-processing unit 100. The pre-processing unit 100 of this embodiment performs a degassing treatment on the supplied liquid W. The pre-processing unit 100 mainly includes a degassing container 101, a shower head 102, a depressurizing pump 103, a liquid introduction passage 104, a liquid circulation passage 105, and a liquid discharge passage 106. For example, the liquid W such as tap water is supplied to the degassing container 101 from the liquid introduction passage 104 through a valve 109. In this process, the shower head 102 provided in the degassing container 101 sprays a mist of the liquid W in the degassing container 101. The shower head 102 is for prompting the gasification of the liquid W; however, a centrifugal and the like may be used instead as the mechanism for producing the gasification prompt effect.

When a certain amount of the liquid W is retained in the degassing container 101 and then the depressurizing pump 103 is activated with all the valves closed, already-gasified gas components are discharged, and gasification and discharge of gas components dissolved in the liquid W are also prompted. In this process, the internal pressure of the degassing container 101 may be depressurized to around several hundreds to thousands of Pa (1.0 Torr to 10.0 Torr) while checking a manometer 108. The gases to be removed by the degassing unit 100 includes nitrogen, oxygen, argon, carbon dioxide, and so on, for example.

The above-described degassing processing can be repeatedly performed on the same liquid W by utilizing the liquid circulation passage 105. Specifically, the shower head 102 is operated with the valve 109 of the liquid introduction passage 104 and a valve 110 of the liquid discharge passage 106 closed and a valve 107 of the liquid circulation passage 105 opened. This allows the liquid W retained in the degassing container 101 and degassed once to be resprayed in the degassing container 101 from the shower head 102. In addition, with the depressurizing pump 103 operated, the gasification processing by the shower head 102 and the degassing processing by the depressurizing pump 103 are repeatedly performed on the same liquid W. Every time the above processing utilizing the liquid circulation passage 105 is performed repeatedly, it is possible to decrease the gas components contained in the liquid W in stages. Once the liquid W degassed to a desired purity is obtained, the liquid W is transferred to the dissolving unit 200 through the liquid discharge passage 106 with the valve 110 opened.

FIG. 2 illustrates the degassing unit 100 that depressurizes the gas part to gasify the solute; however, the method of degassing the solution is not limited thereto. For example, a heating and boiling method for boiling the liquid W to gasify the solute may be employed, or a film degassing method for increasing the interface between the liquid and the gas using hollow fibers. A SEPAREL series (produced by DIC corporation) is commercially supplied as the degassing module using the hollow fibers. The SEPAREL series uses poly(4-methylpentene-1) (PMP) for the raw material of the hollow fibers and is used for removing air bubbles from ink and the like mainly supplied for a piezo head. In addition, two or more of an evacuating method, the heating and boiling method, and the film degassing method may be used together.

With the above-described degassing processing performed as pre-processing, it is possible to increase the purity and the solubility of a desired gas with respect to the liquid W in the dissolving processing described later. Additionally, it is possible to increase the purity of desired UFBs contained in the liquid W in the T-UFB generating unit described later. That is, it is possible to efficiently generate a UFB-containing liquid with high purity by providing the pre-processing unit 100 to precede the dissolving unit 200 and the T-UFB generating unit 300.

Figure 3A:
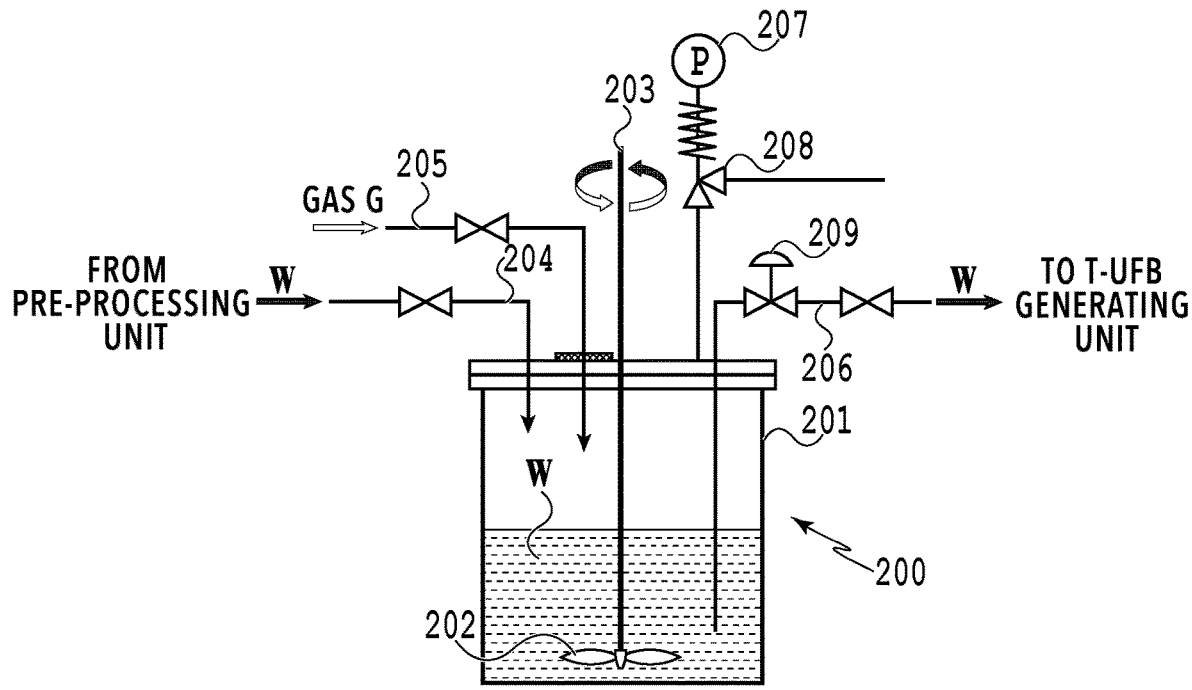
FIGS. 3A and 3B are a schematic configuration diagram of a dissolving unit and a diagram for describing the dissolving states in a liquid.
Figure 3B:
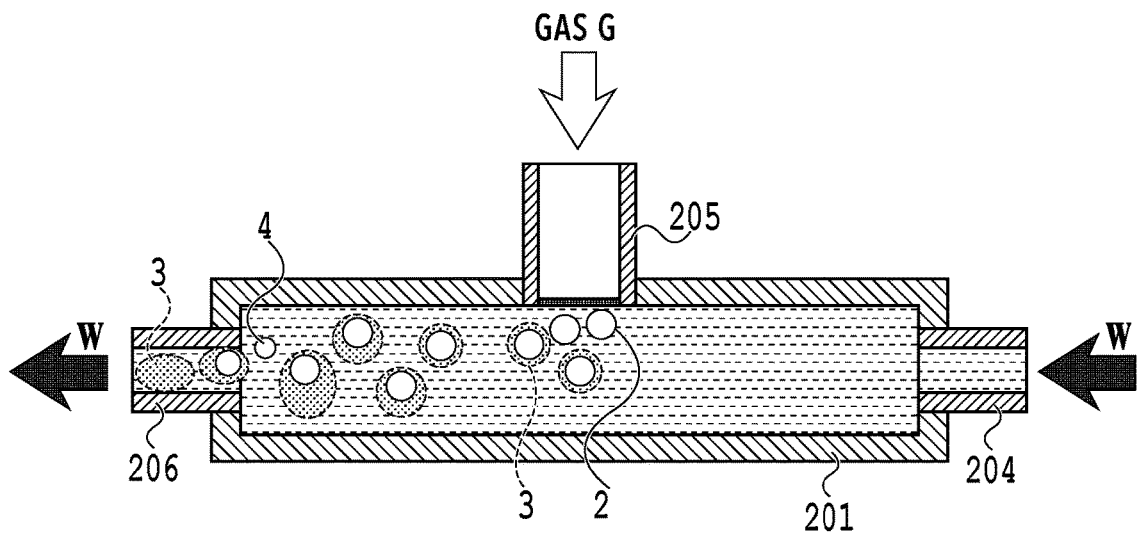

FIGS. 3A and 3B are a schematic configuration diagram of the dissolving unit 200 and a diagram for describing the dissolving states in the liquid. The dissolving unit 200 is a unit for dissolving a desired gas into the liquid W supplied from the pre-processing unit 100. The dissolving unit 200 of this embodiment mainly includes a dissolving container 201, a rotation shaft 203 provided with a rotation plate 202, a liquid introduction passage 204, a gas introduction passage 205, a liquid discharge passage 206, and a pressurizing pump 207.

The liquid W supplied from the pre-processing unit 100 is supplied and retained into the dissolving container 201 through the liquid introduction passage 204. Meanwhile, a gas G is supplied to the dissolving container 201 through the gas introduction passage 205.

Once predetermined amounts of the liquid W and the gas G are retained in the dissolving container 201, the pressurizing pump 207 is activated to increase the internal pressure of the dissolving container 201 to about 0.5 MPa. A safety valve 208 is arranged between the pressurizing pump 207 and the dissolving container 201. With the rotation plate 202 in the liquid rotated via the rotation shaft 203, the gas G supplied to the dissolving container 201 is transformed into air bubbles, and the contact area between the gas G and the liquid W is increased to prompt the dissolution into the liquid W. This operation is continued until the solubility of the gas G reaches almost the maximum saturation solubility. In this case, a unit for decreasing the temperature of the liquid may be provided to dissolve the gas as much as possible. When the gas is with low solubility, it is also possible to increase the internal pressure of the dissolving container 201 to 0.5 MPa or higher. In this case, the material and the like of the container need to be the optimum for safety sake.

Once the liquid W in which the components of the gas G are dissolved at a desired concentration is obtained, the liquid W is discharged through the liquid discharge passage 206 and supplied to the T-UFB generating unit 300. In this process, a back-pressure valve 209 adjusts the flow pressure of the liquid W to prevent excessive increase of the pressure during the supplying.

FIG. 3B is a diagram schematically illustrating the dissolving states of the gas G put in the dissolving container 201. An air bubble 2 containing the components of the gas G put in the liquid W is dissolved from a portion in contact with the liquid W. The air bubble 2 thus shrinks gradually, and a gas-dissolved liquid 3 then appears around the air bubble 2. Since the air bubble 2 is affected by the buoyancy, the air bubble 2 may be moved to a position away from the center of the gas-dissolved liquid 3 or be separated out from the gas-dissolved liquid 3 to become a residual air bubble 4. Specifically, in the liquid W to be supplied to the T-UFB generating unit 300 through the liquid discharge passage 206, there is a mix of the air bubbles 2 surrounded by the gas-dissolved liquids 3 and the air bubbles 2 and the gas-dissolved liquids 3 separated from each other.

The gas-dissolved liquid 3 in FIG. 3B means "a region of the liquid W in which the dissolution concentration of the gas G mixed therein is relatively high." In the gas components actually dissolved in the liquid W in either case where the gas-dissolved liquid 3 is surrounding the air bubble 2 or separated from the air bubble 2, the concentration of the gas components in the center of the region is the highest, and the concentration is continuously decreased as away from the center. That is, although the region of the gas-dissolved liquid 3 is surrounded by a broken line in FIG. 3B for the sake of explanation, such a clear boundary does not actually exist. In addition, in the present embodiment, a gas that cannot be dissolved completely may be accepted to exist in the form of an air bubble in the liquid.

Figure 4:
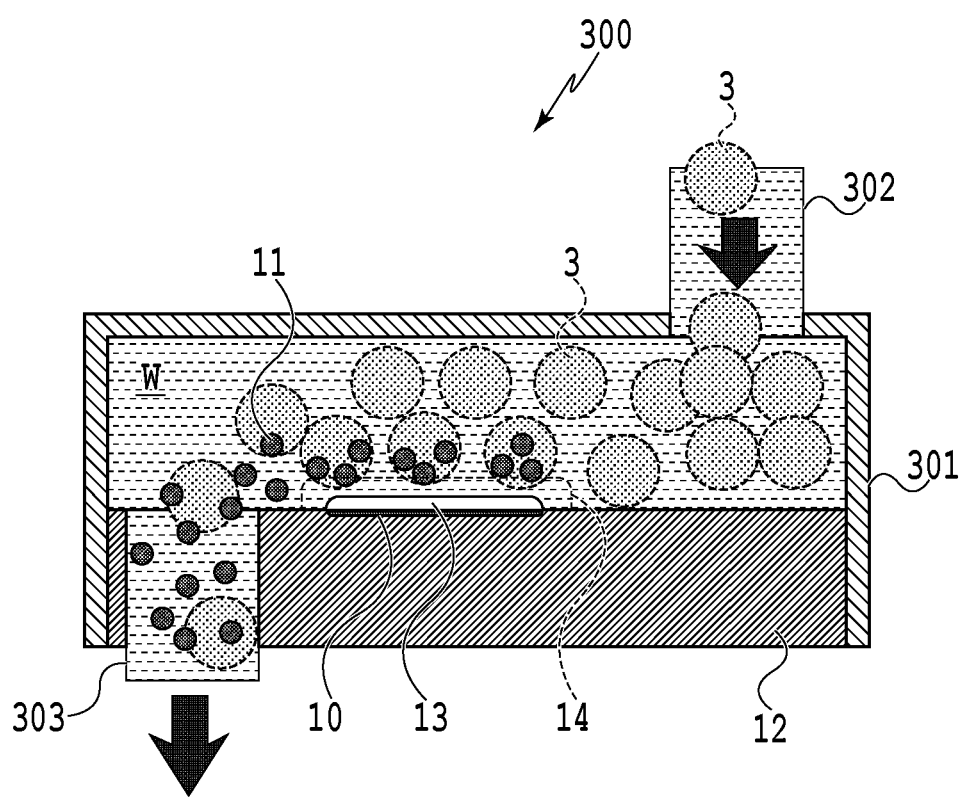
FIG. 4 is a schematic configuration diagram of a T-UFB generating unit.

FIG. 4 is a schematic configuration diagram of the T-UFB generating unit 300. The T-UFB generating unit 300 mainly includes a chamber 301, a liquid introduction passage 302, and a liquid discharge passage 303. The flow from the liquid introduction passage 302 to the liquid discharge passage 303 through the chamber 301 is formed by a not-illustrated flow pump. Various pumps including a diaphragm pump, a gear pump, and a screw pump may be employed as the flow pump. The gas-dissolved liquid 3 of the gas G put by the dissolving unit 200 is mixed in the liquid W introduced from the liquid introduction passage 302.

An element substrate 12 provided with a heating element 10 is arranged on a bottom section of the chamber 301. With a predetermined voltage pulse applied to the heating element 10, a bubble 13 generated by the film boiling (hereinafter, also referred to as a film boiling bubble 13) is generated in a region in contact with the heating element 10. Then, an ultrafine bubble (UFB) 11 containing the gas G is generated caused by expansion and shrinkage of the film boiling bubble 13. As a result, a UFB-containing liquid W containing many UFBs 11 is discharged from the liquid discharge passage 303.

Figure 5A:
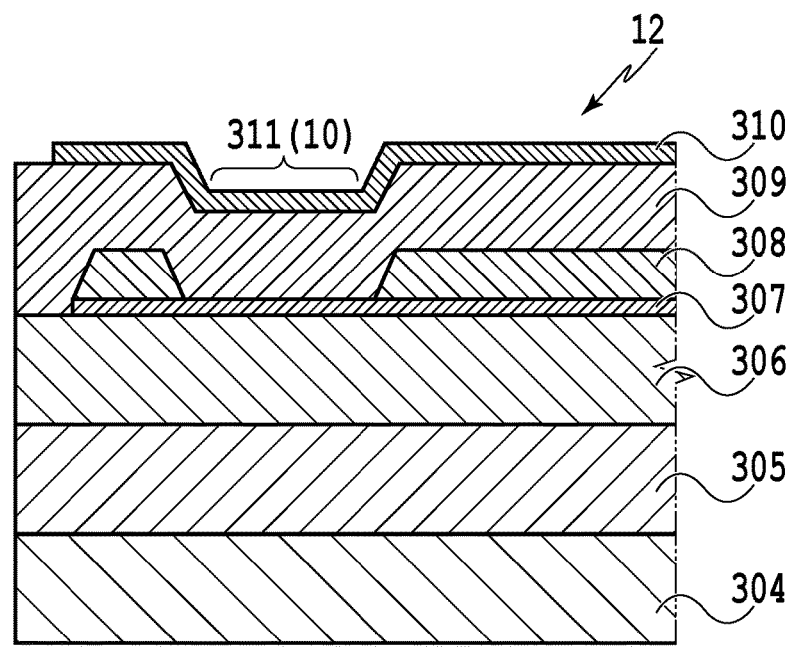
FIGS. 5A and 5B are diagrams for describing details of a heating element.
Figure 5B:
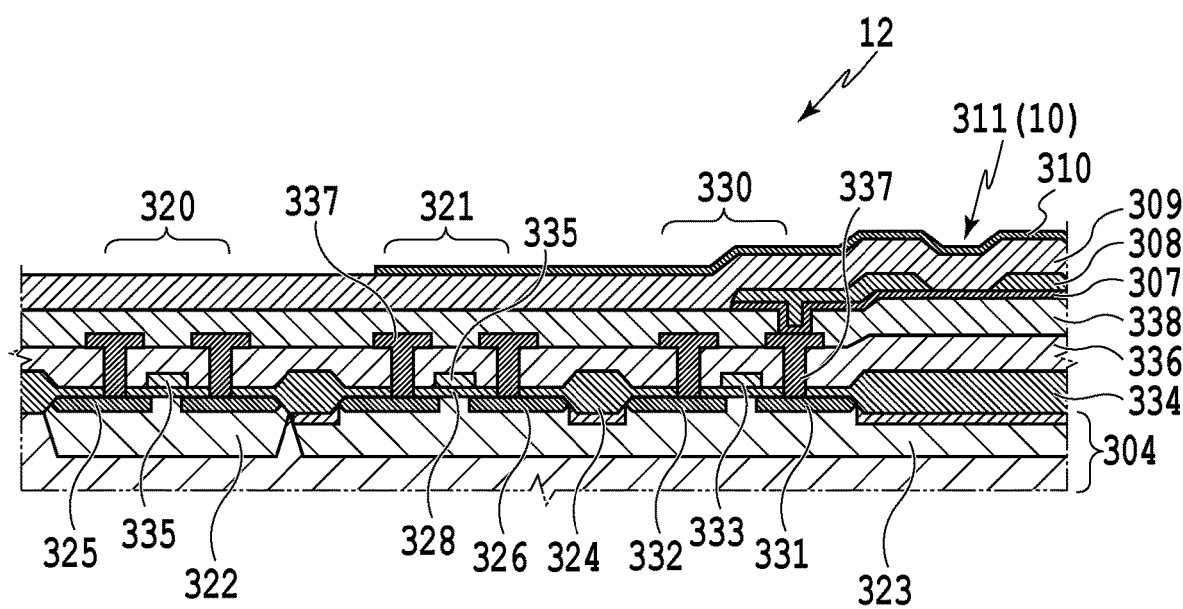

FIGS. 5A and 5B are diagrams for illustrating a detailed configuration of the heating element 10. FIG. 5A illustrates a closeup view of the heating element 10, and FIG. 5B illustrates a cross-sectional view of a wider region of the element substrate 12 including the heating element 10.

As illustrated in FIG. 5A, in the element substrate 12 of this embodiment, a thermal oxide film 305 as a heat-accumulating layer and an interlaminar film 306 also served as a heat-accumulating layer are laminated on a surface of a silicon substrate 304. An $SiO_2$ film or an SiN film may be used as the interlaminar film 306. A resistive layer 307 is formed on a surface of the interlaminar film 306, and a wiring 308 is partially formed on a surface of the resistive layer 307. An Al-alloy wiring of Al, Al—Si, Al—Cu, or the like may be used as the wiring 308. A protective layer 309 made of an $SiO_2$ film or an $Si_3N_4$ film is formed on surfaces of the wiring 308, the resistive layer 307, and the interlaminar film 306.

A cavitation-resistant film 310 for protecting the protective layer 309 from chemical and physical impacts due to the heat evolved by the resistive layer 307 is formed on a portion and around the portion on the surface of the protective layer 309, the portion corresponding to a heat-acting portion 311 that eventually becomes the heating element 10. A region on the surface of the resistive layer 307 in which the wiring 308 is not formed is the heat-acting portion 311 in which the resistive layer 307 evolves heat. The heating portion of the resistive layer 307 on which the wiring 308 is not formed functions as the heating element (heater) 10. As described above, the layers in the element substrate 12 are sequentially formed on the surface of the silicon substrate 304 by a semiconductor production technique, and the heat-acting portion 311 is thus provided on the silicon substrate 304.

The configuration illustrated in FIG. 5A is an example, and various other configurations are applicable. For example, a configuration in which the laminating order of the resistive layer 307 and the wiring 308 is opposite, and a configuration in which an electrode is connected to a lower surface of the resistive layer 307 (so-called a plug electrode configuration) are applicable. In other words, as described later, any configuration may be applied as long as the configuration allows the heat-acting portion 311 to heat the liquid for generating the film boiling in the liquid.

FIG. 5B is an example of a cross-sectional view of a region including a circuit connected to the wiring 308 in the element substrate 12. An N-type well region 322 and a P-type well region 323 are partially provided in a top layer of the silicon substrate 304, which is a P-type conductor. A P-MOS 320 is formed in the N-type well region 322 and an N-MOS 321 is formed in the P-type well region 323 by introduction and diffusion of impurities by the ion implantation and the like in the general MOS process.

The P-MOS 320 includes a source region 325 and a drain region 326 formed by partial introduction of N-type or P-type impurities in a top layer of the N-type well region 322, a gate wiring 335, and so on. The gate wiring 335 is deposited on a part of a top surface of the N-type well region 322 excluding the source region 325 and the drain region 326, with a gate insulation film 328 of several hundreds of Å in thickness interposed between the gate wiring 335 and the top surface of the N-type well region 322.

The N-MOS 321 includes the source region 325 and the drain region 326 formed by partial introduction of N-type or P-type impurities in a top layer of the P-type well region 323, the gate wiring 335, and so on. The gate wiring 335 is deposited on a part of a top surface of the P-type well region 323 excluding the source region 325 and the drain region 326, with the gate insulation film 328 of several hundreds of Å in thickness interposed between the gate wiring 335 and the top surface of the P-type well region 323. The gate wiring 335 is made of polysilicon of 3000 Å to 5000 Å in thickness deposited by the CVD method. A C-MOS logic is constructed with the P-MOS 320 and the N-MOS 321.

In the P-type well region 323, an N-MOS transistor 330 for driving an electrothermal conversion element (heating resistance element) is formed on a portion different from the portion including the N-MOS 321. The N-MOS transistor 330 includes a source region 332 and a drain region 331 partially provided in the top layer of the P-type well region 323 by the steps of introduction and diffusion of impurities, a gate wiring 333, and so on. The gate wiring 333 is deposited on a part of the top surface of the P-type well region 323 excluding the source region 332 and the drain region 331, with the gate insulation film 328 interposed between the gate wiring 333 and the top surface of the P-type well region 323.

In this example, the N-MOS transistor 330 is used as the transistor for driving the electrothermal conversion element. However, the transistor for driving is not limited to the N-MOS transistor 330, and any transistor may be used as long as the transistor has a capability of driving multiple electrothermal conversion elements individually and can implement the above-described fine configuration. Although the electrothermal conversion element and the transistor for driving the electrothermal conversion element are formed on the same substrate in this example, those may be formed on different substrates separately.

An oxide film separation region 324 is formed by field oxidation of 5000 Å to 10000 Å in thickness between the elements, such as between the P-MOS 320 and the N-MOS 321 and between the N-MOS 321 and the N-MOS transistor 330. The oxide film separation region 324 separates the elements. A portion of the oxide film separation region 324 corresponding to the heat-acting portion 311 functions as a heat-accumulating layer 334, which is the first layer on the silicon substrate 304.

An interlayer insulation film 336 including a PSG film, a BPSG film, or the like of about 7000 Å in thickness is formed by the CVD method on each surface of the elements such as the P-MOS 320, the N-MOS 321, and the N-MOS transistor 330. After the interlayer insulation film 336 is made flat by heat treatment, an Al electrode 337 as a first wiring layer is formed in a contact hole penetrating through the interlayer insulation film 336 and the gate insulation film 328. On surfaces of the interlayer insulation film 336 and the Al electrode 337, an interlayer insulation film 338 including an $SiO_2$ film of 10000 Å to 15000 Å in thickness is formed by a plasma CVD method. On the surface of the interlayer insulation film 338, a resistive layer 307 including a TaSiN film of about 500 Å in thickness is formed by a co-sputter method on portions corresponding to the heat-acting portion 311 and the N-MOS transistor 330. The resistive layer 307 is electrically connected with the Al electrode 337 near the drain region 331 via a through-hole formed in the interlayer insulation film 338. On the surface of the resistive layer 307, the wiring 308 of Al as a second wiring layer for a wiring to each electrothermal conversion element is formed. The protective layer 309 on the surfaces of the wiring 308, the resistive layer 307, and the interlayer insulation film 338 includes an SiN film of 3000 Å in thickness formed by the plasma CVD method. The cavitation-resistant film 310 deposited on the surface of the protective layer 309 includes a thin film of about 2000 Å in thickness, which is at least one metal selected from the group consisting of Ta, Fe, Ni, Cr, Ge, Ru, Zr, Ir, and the like. Various materials other than the above-described TaSiN such as TaN0.8, CrSiN, TaAl, WSiN, and the like can be applied as long as the material can generate the film boiling in the liquid.

Figure 6A:
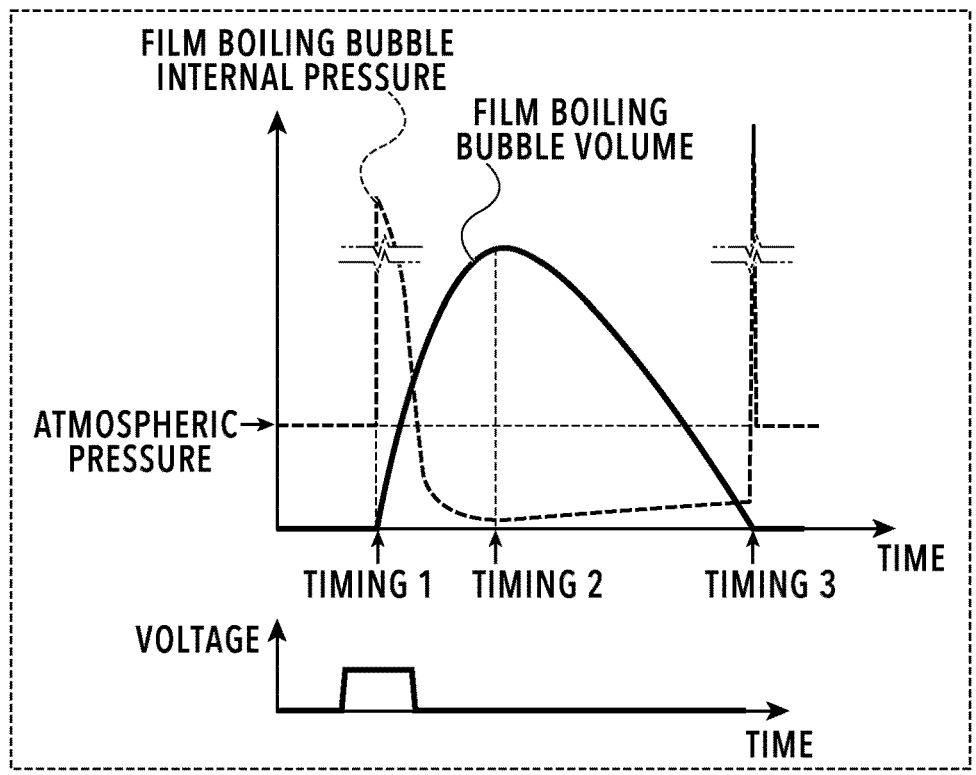
FIGS. 6A and 6B are diagrams for describing the states of film boiling on the heating element.
Figure 6B:
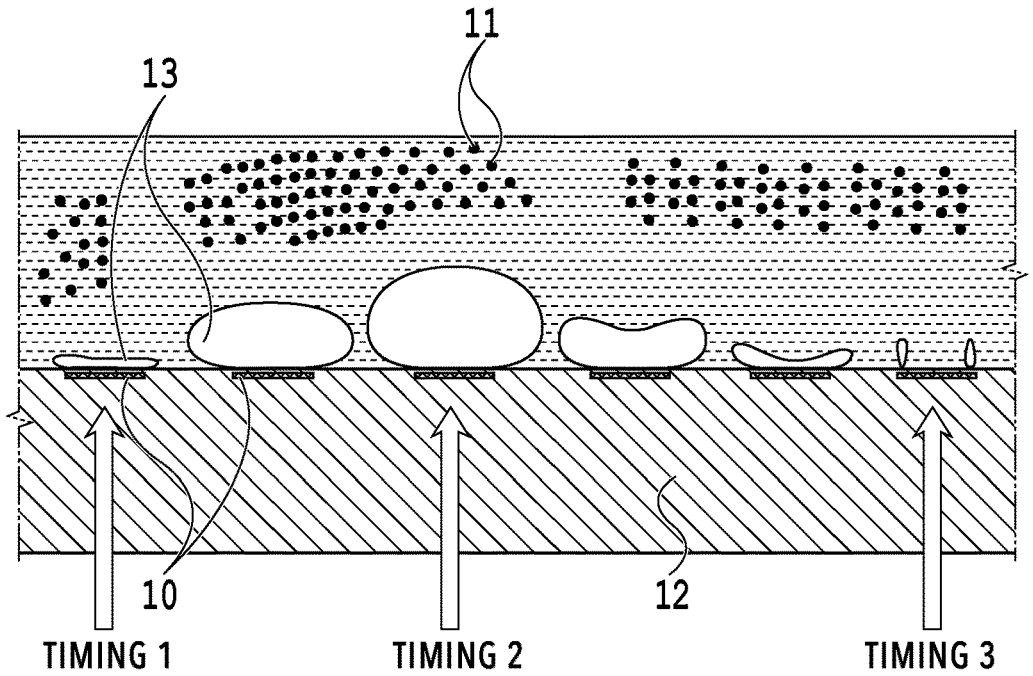

FIGS. 6A and 6B are diagrams illustrating the states of the film boiling when a predetermined voltage pulse is applied to the heating element 10. In this case, the case of generating the film boiling under atmospheric pressure is described. In FIG. 6A, the horizontal axis represents time. The vertical axis in the lower graph represents a voltage applied to the heating element 10, and the vertical axis in the upper graph represents the volume and the internal pressure of the film boiling bubble 13 generated by the film boiling. On the other hand, FIG. 6B illustrates the states of the film boiling bubble 13 in association with timings 1 to 3 shown in FIG. 6A. Each of the states is described below in chronological order.

Before a voltage is applied to the heating element 10, the atmospheric pressure is substantially maintained in the chamber 301. Once a voltage is applied to the heating element 10, the film boiling is generated in the liquid in contact with the heating element 10, and a thus-generated air bubble (hereinafter, referred to as the film boiling bubble 13) is expanded by a high pressure acting from inside (timing 1). A bubbling pressure in this process is expected to be around 8 to 10 MPa, which is a value close to a saturation vapor pressure of water.

The time for applying a voltage (pulse width) is around 0.5 μsec to 10.0 μsec, and the film boiling bubble 13 is expanded by the inertia of the pressure obtained in timing 1 even after the voltage application. However, a negative pressure generated with the expansion is gradually increased inside the film boiling bubble 13, and the negative pressure acts in a direction to shrink the film boiling bubble 13. After a while, the volume of the film boiling bubble 13 becomes the maximum in timing 2 when the inertial force and the negative pressure are balanced, and thereafter the film boiling bubble 13 shrinks rapidly by the negative pressure.

In the disappearance of the film boiling bubble 13, the film boiling bubble 13 disappears not in the entire surface of the heating element 10 but in one or more extremely small regions. For this reason, on the heating element 10, further greater force than that in the bubbling in timing 1 is generated in the extremely small region in which the film boiling bubble 13 disappears (timing 3).

The generation, expansion, shrinkage, and disappearance of the film boiling bubble 13 as described above are repeated every time a voltage pulse is applied to the heating element 10, and new UFBs 11 are generated each time.

The states of generation of the UFBs 11 in each process of the generation, expansion, shrinkage, and disappearance of the film boiling bubble 13 are further described in detail.

Figure 7A:
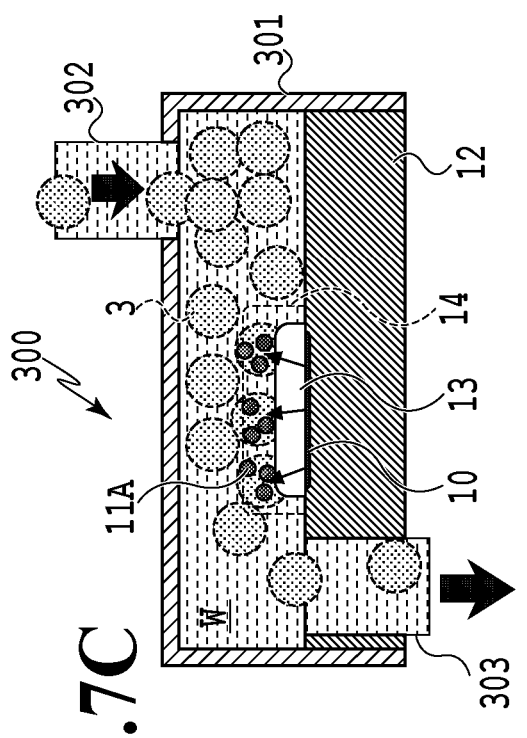
FIGS. 7A to 7D are diagrams illustrating the states of generation of UFBs caused by expansion of a film boiling bubble.

FIGS. 7A to 7D are diagrams illustrating the states of generation of the UFBs 11 caused by the generation and the expansion of the film boiling bubble 13. FIG. 7A illustrates the state before the application of a voltage pulse to the heating element 10. The liquid W in which the gas-dissolved liquids 3 are mixed flows inside the chamber 301.

Figure 7C:
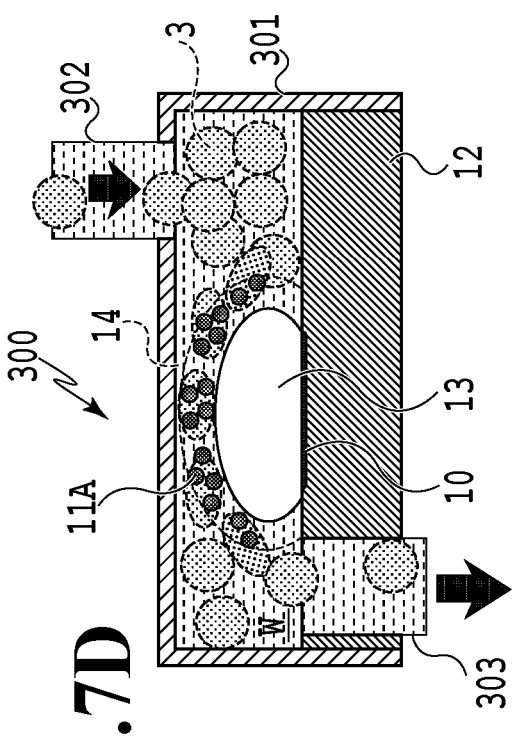
Figure 7B:
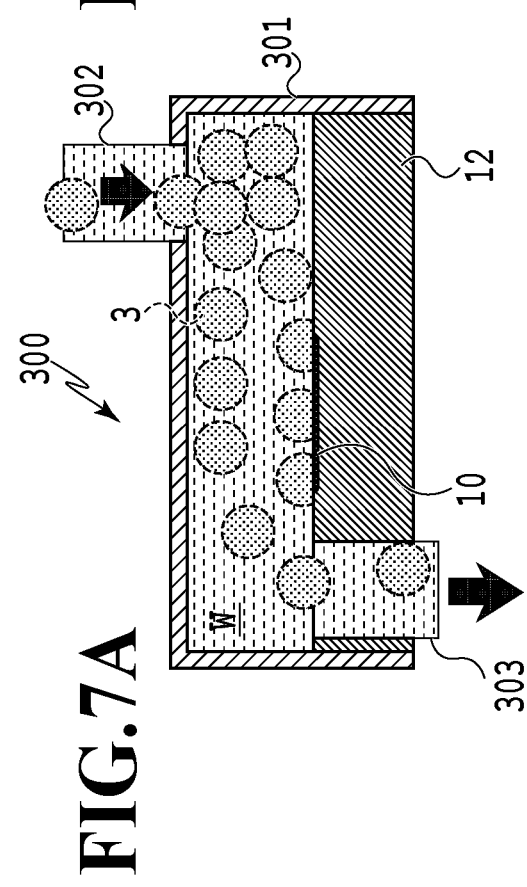

FIG. 7B illustrates the state where a voltage is applied to the heating element 10, and the film boiling bubble 13 is evenly generated in almost all over the region of the heating element 10 in contact with the liquid W. When a voltage is applied, the surface temperature of the heating element 10 rapidly increases at a speed of 10° C./μsec. The film boiling occurs at a time point when the temperature reaches almost 300° C., and the film boiling bubble 13 is thus generated.

Thereafter, the surface temperature of the heating element 10 keeps increasing to around 600 to 800° C. during the pulse application, and the liquid around the film boiling bubble 13 is rapidly heated as well. In FIGS. 7A to 7D, a region of the liquid that is around the film boiling bubble 13 and to be rapidly heated is indicated as a not-yet-bubbling high temperature region 14. The gas-dissolved liquid 3 within the not-yet-bubbling high temperature region 14 exceeds the thermal dissolution limit and is precipitated to become the UFB. The thus-precipitated air bubbles have diameters of around 10 nm to 100 nm and large gas-liquid interface energy. Thus, the air bubbles float independently in the liquid W without disappearing in a short time. In this embodiment, the air bubbles generated by the thermal action during the expansion of the film boiling bubble 13 are called first UFBs 11A.

FIG. 7C illustrates the state where the film boiling bubble 13 is expanded. Even after the voltage pulse application to the heating element 10, the film boiling bubble 13 continues expansion by the inertia of the force obtained from the generation thereof, and the not-yet-bubbling high temperature region 14 is also moved and spread by the inertia. Specifically, in the process of the expansion of the film boiling bubble 13, the gas-dissolved liquid 3 within the not-yet-bubbling high temperature region 14 is precipitated as a new air bubble and becomes the first UFB 11A.

Figure 7D:
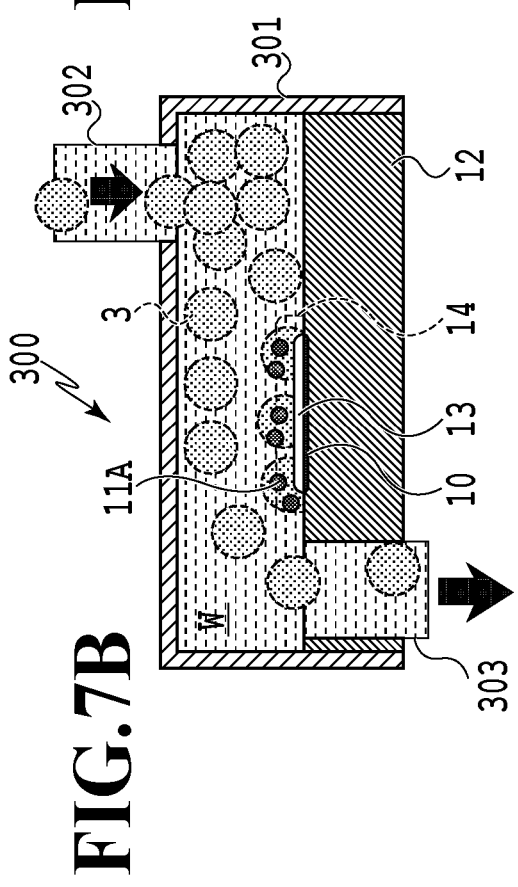

FIG. 7D illustrates the state where the film boiling bubble 13 has the maximum volume. As the film boiling bubble 13 is expanded by the inertia, the negative pressure inside the film boiling bubble 13 is gradually increased along with the expansion, and the negative pressure acts to shrink the film boiling bubble 13. At a time point when the negative pressure and the inertial force are balanced, the volume of the film boiling bubble 13 becomes the maximum, and then the shrinkage is started.

Figure 8A:
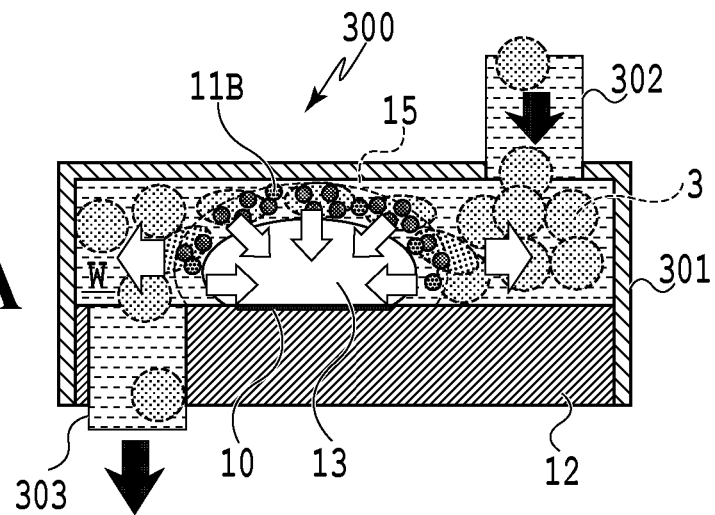
FIGS. 8A to 8C are diagrams illustrating the states of generation of UFBs caused by shrinkage of the film boiling bubble.
Figure 8B:
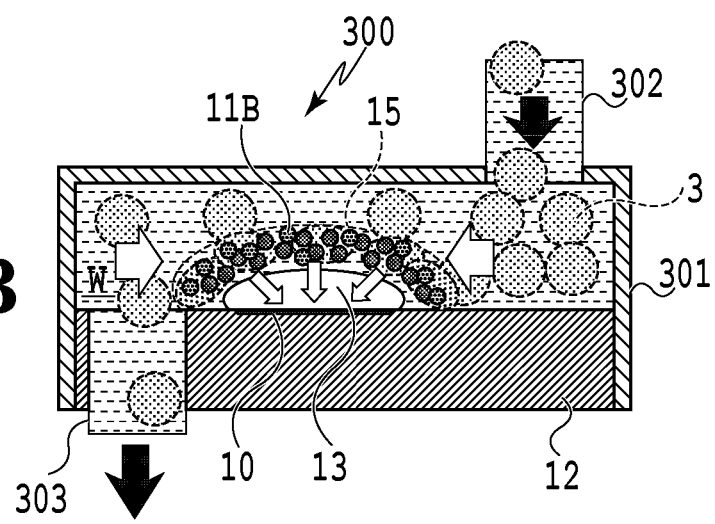
Figure 8C:
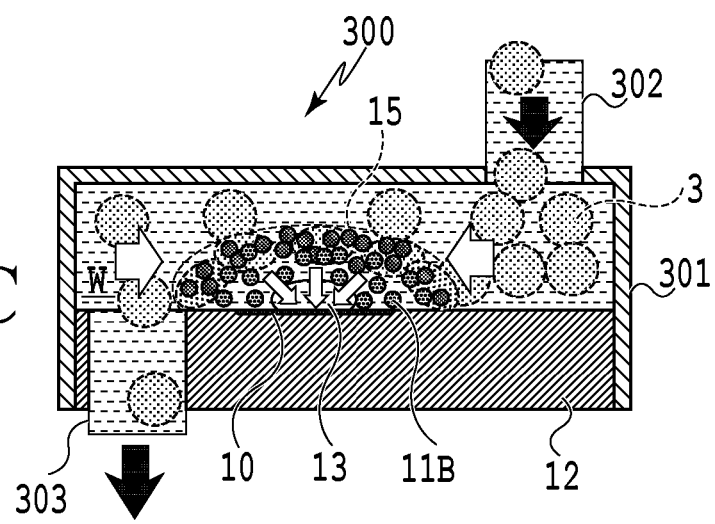

FIGS. 8A to 8C are diagrams illustrating the states of generation of the UFBs 11 caused by the shrinkage of the film boiling bubble 13. FIG. 8A illustrates the state where the film boiling bubble 13 starts shrinking. Although the film boiling bubble 13 starts shrinking, the surrounding liquid W still has the inertial force in the expansion direction. Because of this, the inertial force acting in the direction of going away from the heating element 10 and the force going toward the heating element 10 caused by the shrinkage of the film boiling bubble 13 act in a surrounding region extremely close to the film boiling bubble 13, and the region is depressurized. The region is indicated in FIG. 8A as a not-yet-bubbling negative pressure region 15.

The gas-dissolved liquid 3 within the not-yet-bubbling negative pressure region 15 exceeds the pressure dissolution limit and is precipitated to become an air bubble. The thus-precipitated air bubbles have diameters of about 100 nm and thereafter float independently in the liquid W without disappearing in a short time. In this embodiment, the air bubbles precipitated by the pressure action during the shrinkage of the film boiling bubble 13 are called the second UFBs 11B.

FIG. 8B illustrates a process of the shrinkage of the film boiling bubble 13. The shrinking speed of the film boiling bubble 13 is accelerated by the negative pressure, and the not-yet-bubbling negative pressure region 15 is also moved along with the shrinkage of the film boiling bubble 13. Specifically, in the process of the shrinkage of the film boiling bubble 13, the gas-dissolved liquids 3 within a part over the not-yet-bubbling negative pressure region 15 are precipitated one after another and become the second UFBs 11B.

FIG. 8C illustrates the state immediately before the disappearance of the film boiling bubble 13. Although the moving speed of the surrounding liquid W is also increased by the accelerated shrinkage of the film boiling bubble 13, a pressure loss occurs due to a flow passage resistance in the chamber 301. As a result, the region occupied by the not-yet-bubbling negative pressure region 15 is further increased, and a number of the second UFBs 11B are generated.

Figure 9A:
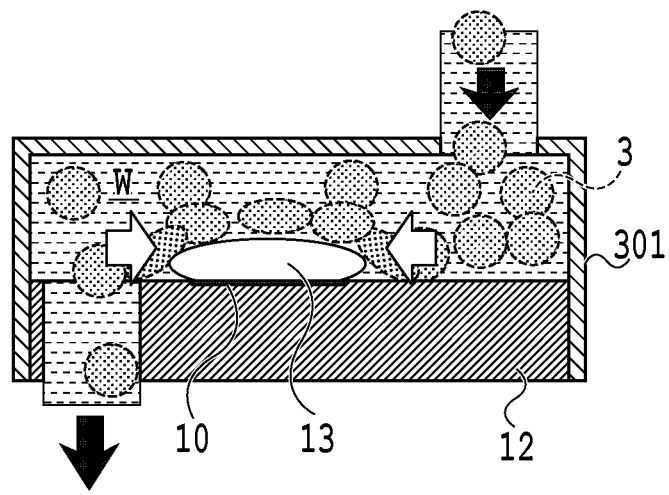
FIGS. 9A to 9C are diagrams illustrating the states of generation of UFBs caused by reheating of the liquid.
Figure 9B:
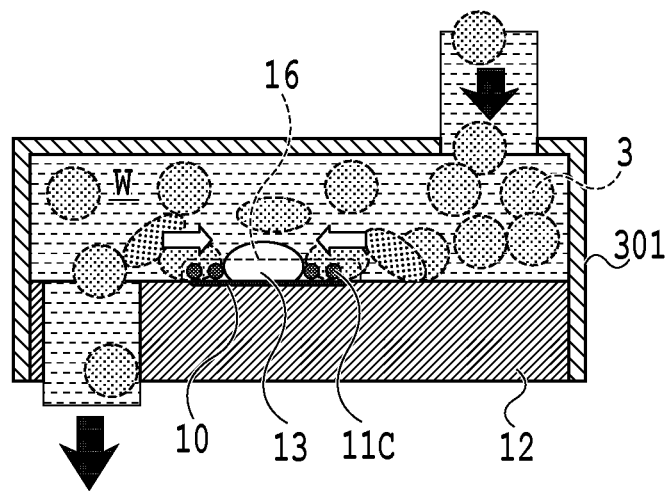
Figure 9C:
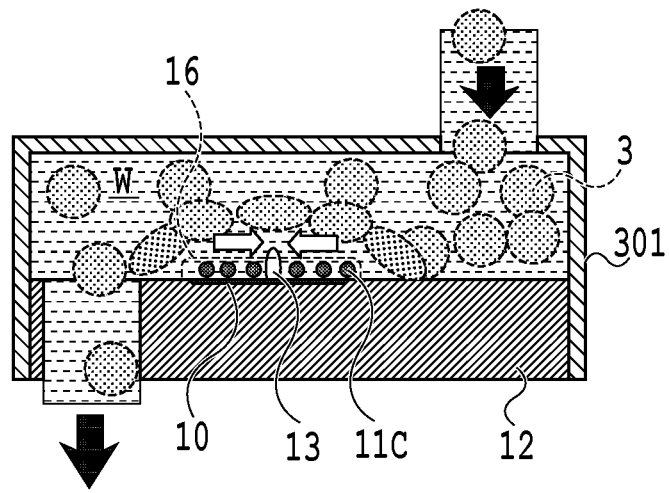

FIGS. 9A to 9C are diagrams illustrating the states of generation of the UFBs by reheating of the liquid W during the shrinkage of the film boiling bubble 13. FIG. 9A illustrates the state where the surface of the heating element 10 is covered with the shrinking film boiling bubble 13.

FIG. 9B illustrates the state where the shrinkage of the film boiling bubble 13 has progressed, and a part of the surface of the heating element 10 comes in contact with the liquid W. In this state, there is heat left on the surface of the heating element 10, but the heat is not high enough to cause the film boiling even if the liquid W comes in contact with the surface. A region of the liquid to be heated by coming in contact with the surface of the heating element 10 is indicated in FIG. 9B as a not-yet-bubbling reheated region 16. Although the film boiling is not made, the gas-dissolved liquid 3 within the not-yet-bubbling reheated region 16 exceeds the thermal dissolution limit and is precipitated. In this embodiment, the air bubbles generated by the reheating of the liquid W during the shrinkage of the film boiling bubble 13 are called the third UFBs 11C.

FIG. 9C illustrates the state where the shrinkage of the film boiling bubble 13 has further progressed. The smaller the film boiling bubble 13, the greater the region of the heating element 10 in contact with the liquid W, and the third UFBs 11C are generated until the film boiling bubble 13 disappears.

Figure 10A:
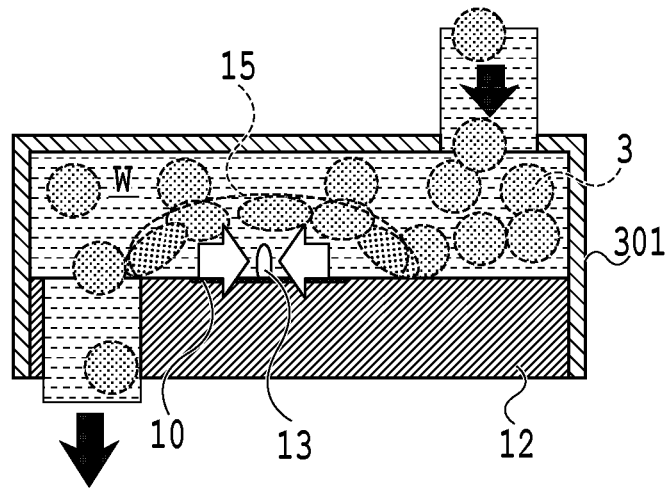
FIGS. 10A and 10B are diagrams illustrating the states of generation of UFBs caused by shock waves made by disappearance of the bubble generated by the film boiling.
Figure 10B:
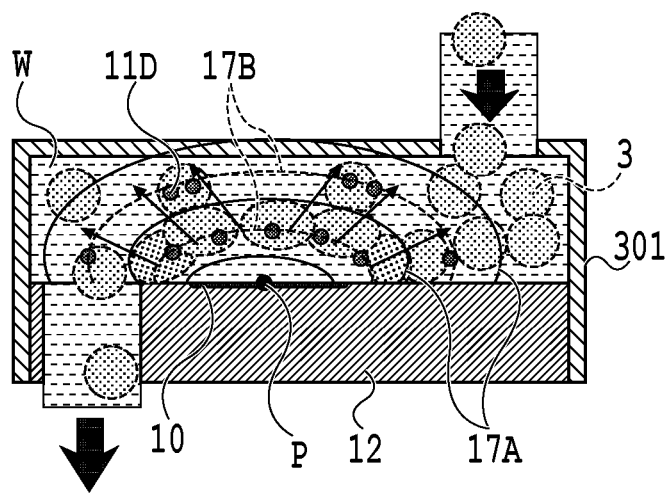

FIGS. 10A and 10B are diagrams illustrating the states of generation of the UFBs caused by an impact from the disappearance of the film boiling bubble 13 generated by the film boiling (that is, a type of cavitation). FIG. 10A illustrates the state immediately before the disappearance of the film boiling bubble 13. In this state, the film boiling bubble 13 shrinks rapidly by the internal negative pressure, and the not-yet-bubbling negative pressure region 15 surrounds the film boiling bubble 13.

FIG. 10B illustrates the state immediately after the film boiling bubble 13 disappears at a point P. When the film boiling bubble 13 disappears, acoustic waves ripple concentrically from the point P as a starting point due to the impact of the disappearance. The acoustic wave is a collective term of an elastic wave that is propagated through anything regardless of gas, liquid, and solid. In this embodiment, coarse of the liquid W, which are a high pressure surface 17A and a low pressure surface 17B of the liquid W, are propagated alternately.

In this case, the gas-dissolved liquid 3 within the not-yet-bubbling negative pressure region 15 is resonated by the shock waves made by the disappearance of the film boiling bubble 13, and the gas-dissolved liquid 3 exceeds the pressure dissolution limit and the phase transition is made in timing when the low pressure surface 17B passes therethrough. Specifically, a number of air bubbles are precipitated in the not-yet-bubbling negative pressure region 15 simultaneously with the disappearance of the film boiling bubble 13. In this embodiment, the air bubbles generated by the shock waves made by the disappearance of the film boiling bubble 13 are called fourth UFBs 11D.

The fourth UFBs 11D generated by the shock waves made by the disappearance of the film boiling bubble 13 suddenly appear in an extremely short time (1 µS or less) in an extremely narrow thin film-shaped region. The diameter is sufficiently smaller than that of the first to third UFBs, and the gas-liquid interface energy is higher than that of the first to third UFBs. For this reason, the fourth UFBs 11D have different characteristics from the first to third UFBs 11A to 11C and generate different effects.

Additionally, the fourth UFBs 11D are evenly generated in many parts of the region of the concentric sphere in which the shock waves are propagated, and the fourth UFBs 11D evenly exist in the chamber 301 from the generation thereof. Although many first to third UFBs already exist in the timing of the generation of the fourth UFBs 11D, the presence of the first to third UFBs does not affect the generation of the fourth UFBs 11D greatly. It is also considered that the first to third UFBs do not disappear due to the generation of the fourth UFBs 11D.

As described above, the UFBs 11 are generated in the multiple stages from the generation to the disappearance of the film boiling bubble 13 by the heat generation of the heating element 10. Although the above example illustrates the stages to the disappearance of the film boiling bubble 13, the way of generating the UFBs is not limited thereto. For example, with the generated film boiling bubble 13 communicating with the atmospheric air before the bubble disappearance, the UFBs can be generated also if the film boiling bubble 13 does not reach the bubble disappearance.

Next, remaining properties of the UFBs are described. The higher the temperature of the liquid, the lower the dissolution properties of the gas components, and the lower the temperature, the higher the dissolution properties of the gas components. In other words, the phase transition of the dissolved gas components is prompted and the generation of the UFBs becomes easier as the temperature of the liquid is higher. The temperature of the liquid and the solubility of the gas are in the inverse relationship, and the gas exceeding the saturation solubility is transformed into air bubbles and precipitated into the liquid as the liquid temperature increases.

Therefore, when the temperature of the liquid rapidly increases from normal temperature, the dissolution properties are decreased without stopping, and the generation of the UFBs starts. The thermal dissolution properties are decreased as the temperature increases, and a number of the UFBs are generated.

Conversely, when the temperature of the liquid decreases from normal temperature, the dissolution properties of the gas are increased, and the generated UFBs are more likely to be liquefied. However, the temperature is sufficiently lower than normal temperature. Additionally, since the once generated UFBs have a high internal pressure and large gas-liquid interface energy even when the temperature of the liquid decreases, it is highly unlikely that there is exerted a sufficiently high pressure to break such a gas-liquid interface. In other words, the once generated UFBs do not disappear easily as long as the liquid is stored at normal temperature and normal pressure.

In this embodiment, the first UFBs 11A described with FIGS. 7A to 7C and the third UFBs 11C described with FIGS. 9A to 9C can be described as UFBs that are generated by utilizing such thermal dissolution properties of gas.

On the other hand, in the relationship between the pressure and the dissolution properties of liquid, the higher the pressure of the liquid, the higher the dissolution properties of the gas, and the lower the pressure, the lower the dissolution properties. In other words, the phase transition to the gas of the gas-dissolved liquid dissolved in the liquid is prompted and the generation of the UFBs becomes easier as the pressure of the liquid is lower. Once the pressure of the liquid becomes lower than normal pressure, the dissolution properties are decreased without stopping, and the generation of the UFBs starts. The pressure dissolution properties are decreased as the pressure decreases, and a number of the UFBs are generated.

Conversely, when the pressure of the liquid increases to be higher than normal pressure, the dissolution properties of the gas are increased, and the generated UFBs are more likely to be liquefied. However, the pressure is sufficiently higher than the atmospheric pressure. Additionally, since the once generated UFBs have a high internal pressure and large gas-liquid interface energy even when the pressure of the liquid increases, it is highly unlikely that there is exerted a sufficiently high pressure to break such a gas-liquid interface. In other words, the once generated UFBs do not disappear easily as long as the liquid is stored at normal temperature and normal pressure.

In this embodiment, the second UFBs 11B described with FIGS. 8A to 8C and the fourth UFBs 11D described with FIGS. 10A and 10B can be described as UFBs that are generated by utilizing such pressure dissolution properties of gas.

Those first to fourth UFBs generated by different causes are described individually above; however, the above-described generation causes occur simultaneously with the event of the film boiling. Thus, at least two types of the first to the fourth UFBs may be generated at the same time, and these generation causes may cooperate to generate the UFBs. It should be noted that it is common for all the generation causes to be induced by the film boiling phenomenon. Hereinafter, in this specification, the method of generating the UFBs by utilizing the film boiling caused by the rapid heating as described above is referred to as a thermal-ultrafine bubble (T-UFB) generating method. Additionally, the UFBs generated by the T-UFB generating method are referred to as T-UFBs, and the liquid containing the T-UFBs generated by the T-UFB generating method is referred to as a T-UFB-containing liquid.

Almost all the air bubbles generated by the T-UFB generating method are 1.0 µm or less, and milli-bubbles and microbubbles are unlikely to be generated. That is, the T-UFB generating method allows dominant and efficient generation of the only UFBs. Additionally, the T-UFBs generated by the T-UFB generating method have larger gas-liquid interface energy than that of the UFBs generated by a conventional method, and the T-UFBs do not disappear easily as long as being stored at normal temperature and normal pressure. Moreover, even if new T-UFBs are generated by new film boiling, the already generated T-UFBs never disappear due to the impact from the new generation. That is, it can be said that the number and the concentration of the T-UFBs contained in the T-UFB-containing liquid have the hysteresis properties depending on the number of times the film boiling is made in the T-UFB-containing liquid. In other words, it is possible to adjust the concentration of the T-UFBs contained in the T-UFB-containing liquid by controlling the number of the heating elements provided in the T-UFB generating unit 300 and the number of the voltage pulse application to the heating elements.

Reference to FIG. 1 is made again. Once the T-UFB-containing liquid W with a desired UFB concentration is generated in the T-UFB generating unit 300, the UFB-containing liquid W is supplied to the post-processing unit 400.

Figure 11A:
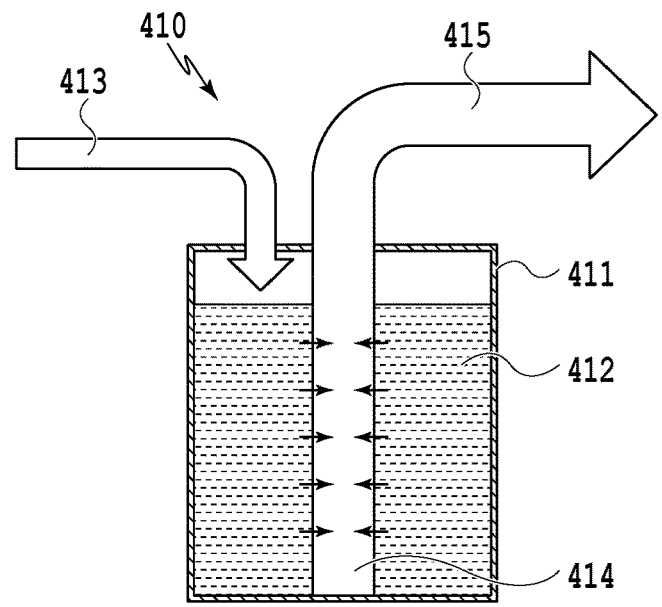
FIGS. 11A to 11C are diagrams illustrating a configuration example of a post-processing unit.
Figure 11B:
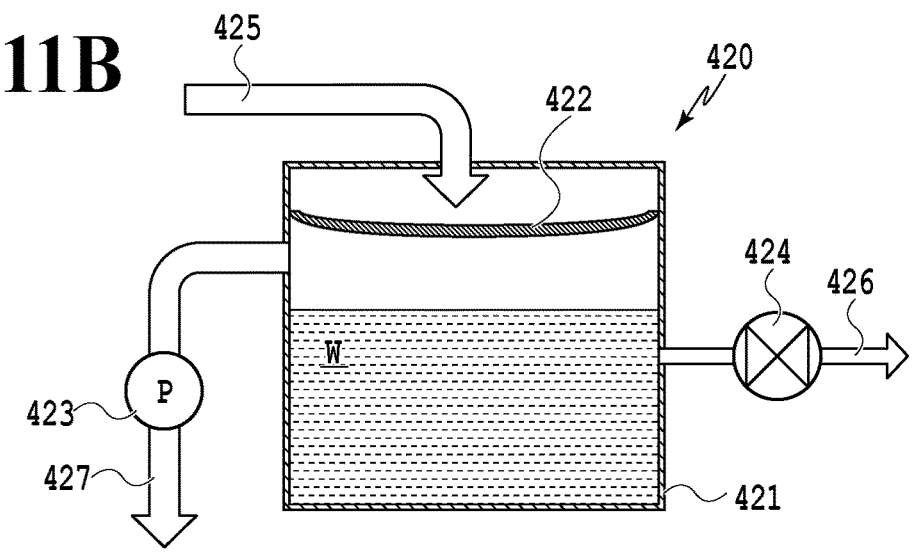
Figure 11C:
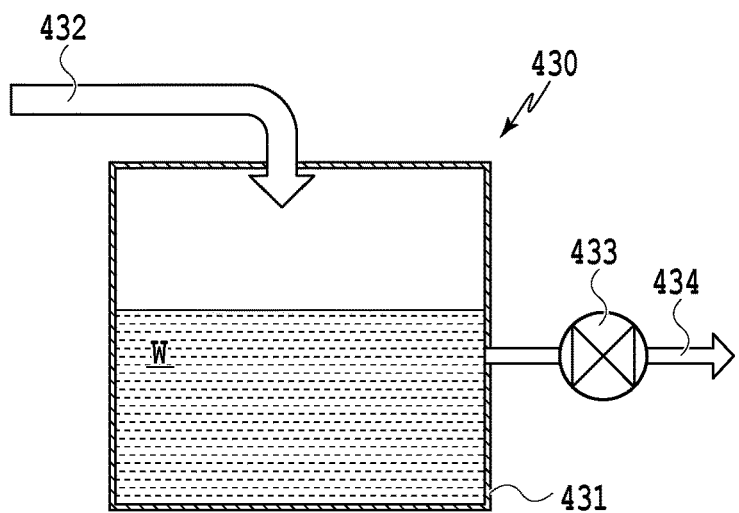

FIGS. 11A to 11C are diagrams illustrating configuration examples of the post-processing unit 400 of this embodiment. The post-processing unit 400 of this embodiment removes impurities in the UFB-containing liquid W in stages in the order from inorganic ions, organic substances, and insoluble solid substances.

FIG. 11A illustrates a first post-processing mechanism 410 that removes the inorganic ions. The first post-processing mechanism 410 includes an exchange container 411, cation exchange resins 412, a liquid introduction passage 413, a collecting pipe 414, and a liquid discharge passage

415. The exchange container 411 stores the cation exchange resins 412. The UFB-containing liquid W generated by the T-UFB generating unit 300 is injected to the exchange container 411 through the liquid introduction passage 413 and absorbed into the cation exchange resins 412 such that the cations as the impurities are removed. Such impurities include metal materials peeled off from the element substrate 12 of the T-UFB generating unit 300, such as $SiO_2$, SiN, SiC, Ta, $Al_2O_3$, $Ta_2O_5$, and Ir.

The cation exchange resins 412 are synthetic resins in which a functional group (ion exchange group) is introduced in a high polymer matrix having a three-dimensional network, and the appearance of the synthetic resins are spherical particles of around 0.4 to 0.7 mm. A general high polymer matrix is the styrene-divinylbenzene copolymer, and the functional group may be that of methacrylic acid series and acrylic acid series, for example. However, the above material is an example. As long as the material can remove desired inorganic ions effectively, the above material can be changed to various materials. The UFB-containing liquid W absorbed in the cation exchange resins 412 to remove the inorganic ions is collected by the collecting pipe 414 and transferred to the next step through the liquid discharge passage 415.

FIG. 11B illustrates a second post-processing mechanism 420 that removes the organic substances. The second post-processing mechanism 420 includes a storage container 421, a filtration filter 422, a vacuum pump 423, a valve 424, a liquid introduction passage 425, a liquid discharge passage 426, and an air suction passage 427. Inside of the storage container 421 is divided into upper and lower two regions by the filtration filter 422. The liquid introduction passage 425 is connected to the upper region of the upper and lower two regions, and the air suction passage 427 and the liquid discharge passage 426 are connected to the lower region thereof. Once the vacuum pump 423 is driven with the valve 424 closed, the air in the storage container 421 is discharged through the air suction passage 427 to make the pressure inside the storage container 421 negative pressure, and the UFB-containing liquid W is thereafter introduced from the liquid introduction passage 425. Then, the UFB-containing liquid W from which the impurities are removed by the filtration filter 422 is retained into the storage container 421.

The impurities removed by the filtration filter 422 include organic materials that may be mixed at a tube or each unit, such as organic compounds including silicon, siloxane, and epoxy, for example. A filter film usable for the filtration filter 422 includes a filter of a sub-μm-mesh that can remove bacteria, and a filter of a nm-mesh that can remove virus.

After a certain amount of the UFB-containing liquid W is retained in the storage container 421, the vacuum pump 423 is stopped and the valve 424 is opened to transfer the T-UFB-containing liquid in the storage container 421 to the next step through the liquid discharge passage 426. Although the vacuum filtration method is employed as the method of removing the organic impurities herein, a gravity filtration method and a pressurized filtration can also be employed as the filtration method using a filter, for example.

FIG. 11C illustrates a third post-processing mechanism 430 that removes the insoluble solid substances. The third post-processing mechanism 430 includes a precipitation container 431, a liquid introduction passage 432, a valve 433, and a liquid discharge passage 434.

First, a predetermined amount of the UFB-containing liquid W is retained into the precipitation container 431 through the liquid introduction passage 432 with the valve 433 closed, and leaving it for a while. Meanwhile, the solid substances in the UFB-containing liquid W are precipitated onto the bottom of the precipitation container 431 by gravity. Among the bubbles in the UFB-containing liquid, relatively large bubbles such as microbubbles are raised to the liquid surface by the buoyancy and also removed from the UFB-containing liquid. After a lapse of sufficient time, the valve 433 is opened, and the UFB-containing liquid W from which the solid substances and large bubbles are removed is transferred to the collecting unit 500 through the liquid discharge passage 434.

Reference to FIG. 1 is made again. The T-UFB-containing liquid W from which the impurities are removed by the post-processing unit 400 may be directly transferred to the collecting unit 500 or may be put back to the dissolving unit 200 again. In the latter case, the gas dissolution concentration of the T-UFB-containing liquid W that is decreased due to the generation of the T-UFBs can be compensated to the saturated state again by the dissolving unit 200. If new T-UFBs are generated by the T-UFB generating unit 300 after the compensation, it is possible to further increase the concentration of the UFBs contained in the T-UFB-containing liquid with the above-described properties. That is, it is possible to increase the concentration of the contained UFBs by the number of circulations through the dissolving unit 200, the T-UFB generating unit 300, and the post-processing unit 400, and it is possible to transfer the UFB-containing liquid W to the collecting unit 500 after a predetermined concentration of the contained UFBs is obtained.

Here, an effect of putting back the generated T-UFB-containing liquid W to the dissolving unit 200 again is simply described in accordance with details of specific testing performed by the present inventors. First, in the T-UFB generating unit 300, 10000 pieces of the heating elements 10 were arranged on the element substrate 12. Industrial pure water was used as the liquid W and was flowed in the chamber 301 of the T-UFB generating unit 300 at a flow rate of 1.0 liter/hour. I this state, a voltage pulse with a voltage of 24 V and a pulse width of 1.0 us was applied at a driving frequency of 10 kHz to the individual heating elements.

In a case where the generated T-UFB-containing liquid W was collected by the collecting unit 500 without putting back to the dissolving unit 200, that is, in a case where the number of circulation was one time, 3.6 billion pieces per mL of the UFBs were confirmed in the T-UFB-containing liquid W collected by the collecting unit 500. On the other hand, in a case where the operation of putting back the T-UFB-containing liquid W to the dissolving unit 200 was performed ten times, that is, in a case where the number of circulation was ten times, 36 billion pieces per mL of the UFBs were confirmed in the T-UFB-containing liquid W collected by the collecting unit 500. That is, it was confirmed that the UFB-containing concentration is increased in the proportion of the number of circulation. The number density of the UFBs as described above was obtained by counting the UFBs smaller than 1.0 μm in diameter contained in the UFB-containing liquid W of a predetermined volume by using a measuring instrument (model number SALD-7500) manufactured by SHIMADZU CORPORATION.

The collecting unit 500 collects and preserves the UFB-containing liquid W transferred from the post-processing unit 400. The T-UFB-containing liquid collected by the collecting unit 500 is a UFB-containing liquid with high purity from which various impurities are removed.

In the collecting unit 500, the UFB-containing liquid W may be classified by the size of the T-UFBs by performing some stages of filtration processing. Since it is expected that the temperature of the T-UFB-containing liquid W obtained by the T-UFB generating method is higher than normal temperature, the collecting unit 500 may be provided with a cooling unit. The cooling unit may be provided to a part of the post-processing unit 400.

The schematic description of the UFB generating apparatus 1 is given above; however, it is needless to say that the illustrated multiple units can be changed, and not all of them need to be prepared. Depending on the type of the liquid W and the gas G to be used and the intended use of the T-UFB-containing liquid to be generated, a part of the above-described units may be omitted, or another unit other than the above-described units may be added.

For example, when the gas to be contained by the UFBs is the atmospheric air, the degassing unit 100 and the dissolving unit 200 can be omitted. On the other hand, when multiple kinds of gases are desired to be contained by the UFBs, another dissolving unit 200 may be added.

The functions of some units illustrated in FIG. 1 can be integrated into a single unit. For example, the dissolving unit 200 and the T-UFB generating unit 300 can be integrated by arranging the heating element 10 in the dissolving container 201 illustrated in FIGS. 3A and 3B. Specifically, an electrode type T-UFB module is disposed in a gas dissolving container (high-pressure chamber), and multiple heaters arranged in the module are driven to make film boiling. Such a configuration allows a single unit to generate T-UFBs containing a gas while dissolving the gas therein. In this case, with the T-UFB module arranged on a base of the gas dissolving container, a Marangoni flow occurs due to the heat generated by the heaters, and the liquid in the container can be agitated to some extent without providing a circulating and agitating unit.

The removing units for removing the impurities as illustrated in FIGS. 11A to 11C may be provided upstream of the T-UFB generating unit 300 as a part of the pre-processing unit or may be provided both upstream and downstream thereof. In a case where the liquid to be supplied to the UFB generating apparatus is tap water, rain water, contaminated water, or the like, there may be included organic and inorganic impurities in the liquid. If such a liquid W including the impurities is supplied to the T-UFB generating unit 300, there occurs a risk of deteriorating the heating element 10 and inducing the salting-out phenomenon. With the mechanisms as illustrated in FIGS. 11A to 11C provided upstream of the T-UFB generating unit 300, it is possible to remove the above-described impurities previously and to more efficiently generate a UFB-containing liquid with higher purity.

Particularly, in a case where an impurity removing unit using an ion-exchange resin illustrated in FIG. 11A is provided in the pre-processing unit, arrangement an anion-exchange resin contributes efficient generation of T-UFB water. This is because it has been confirmed that the ultrafine bubbles generated by the T-UFB generating unit 300 have a negative charge. Accordingly, T-UFB water with high purity can be generated by removing the impurities having the same negative charges in the pre-processing unit. As the anion-exchange resin used herein, both the strongly basic anion-exchange resin having quaternary ammonium group and weakly basic anion-exchange resin having primary to tertiary amine group are appropriate. Which of these is appropriate depends on the type of the liquid to be used. Usually, in a case of using tap water, pure water, or the like as the liquid, the function can be fulfilled sufficiently by using only the latter weakly basic anion-exchange resin.

<<Liquid and Gas Usable for T-UFB-Containing Liquid>>

Now, the liquid W usable for generating the T-UFB-containing liquid is described. The liquid W usable in this embodiment is, for example, pure water, ion exchange water, distilled water, bioactive water, magnetic active water, lotion, tap water, sea water, river water, clean and sewage water, lake water, underground water, rain water, and so on. A mixed liquid containing the above liquid and the like is also usable. A mixed solvent containing water and soluble organic solvent can be also used. The soluble organic solvent to be used by being mixed with water is not particularly limited; however, the followings can be a specific example thereof. An alkyl alcohol group of the carbon number of 1 to 4 including methyl alcohol, ethyl alcohol, n-propyl alcohol, isopropyl alcohol, n-butyl alcohol, sec-butyl alcohol, and tert-butyl alcohol. An amide group including N-methyl-2-pyrrolidone, 2-pyrrolidone, 1,3-dimethyl-2-imidazolidinone, N,N-dimethylformamide, and N,N-dimethylacetamide. A keton group or a ketoalcohol group including acetone and diacetone alcohol. A cyclic ether group including tetrahydrofuran and dioxane. A glycol group including ethylene glycol, 1,2-propylene glycol, 1,3-propylene glycol, 1,2-butanediol, 1,3-butanediol, 1,4-butanediol, 1,5-pentanediol, 1,2-hexanediol, 1,6-hexanediol, 3-methyl-1,5-pentanediol, diethylene glycol, triethylene glycol, and thiodiglycol. A group of lower alkyl ether of polyhydric alcohol including ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether. A polyalkylene glycol group including polyethylene glycol and polypropylene glycol. A triol group including glycerin, 1,2,6-hexanetriol, and trimethylolpropane. These soluble organic solvents can be used individually, or two or more of them can be used together.

A gas component that can be introduced into the dissolving unit 200 is, for example, hydrogen, helium, oxygen, nitrogen, methane, fluorine, neon, carbon dioxide, ozone, argon, chlorine, ethane, propane, air, and so on. The gas component may be a mixed gas containing some of the above. Additionally, it is not necessary for the dissolving unit 200 to dissolve a substance in a gas state, and the dissolving unit 200 may fuse a liquid or a solid containing desired components into the liquid W. The dissolution in this case may be spontaneous dissolution, dissolution caused by pressure application, or dissolution caused by hydration, ionization, and chemical reaction due to electrolytic dissociation.

<<Specific Example of Case of Using Ozone Gas>>

As a specific example, here is described a case of using an ozone gas as a gas component. First, a generating method for an ozone gas includes an electric discharge method, an electrolytic method, and an ultraviolet lamp method. The above methods are described below in sequence.

(1) Electric Discharge Method

The electric discharge method includes a silent electric discharge method and a surface electric discharge method. In the silent electric discharge method, an alternating-current high voltage is applied while an oxygen-containing gas is flowed between a pair of electrodes arranged in the form of parallel flat plates or coaxial cylinders. With this, discharge occurs in the oxygen-containing gas, and an ozone gas is generated. One of or both the surfaces of the pair of electrodes need to be covered with a dielectric such as glass. The discharge occurs in a gas (air or oxygen) in association with alternate variation, positively and negatively, of charges on the surface of the dielectric.

On the other hand, in the surface electric discharge method, a surface of a flat surface-shaped electrode is covered with a dielectric such as ceramics, and a linear electrode is arranged on the surface of the dielectric. Then, an alternating-current high voltage is applied between the flat plate-shaped electrode and the linear electrode. With this, discharge occurs on the surface of the dielectric, and an ozone gas is generated.

(2) Electrolytic Method

A pair of electrodes with an electrolyte membrane arranged therebetween are arranged in water, and a direct-current voltage is applied between the two electrodes. With this, electrolysis of the water occurs, and an ozone gas is generated with oxygen on the oxygen generation side. An ozone generator being practically used includes porous titanium having a platinum catalyst layer on a cathode, porous titanium having a lead dioxide catalyst layer on an anode, one using a perfluorosulfonic acid cation-exchange membrane as an electrolyte membrane, and the like. According to the present apparatus, highly concentrated ozone of 20% by weight or greater can be generated.

(3) Ultraviolet Lamp Method

An ozone gas is generated by exposing ultraviolet to the air and the like by using a similar principle as that of how the ozone layer of Earth is created. Usually, a mercury lamp is used as an ultraviolet lamp.

Note that, in a case of using an ozone gas as the gas component, an ozone gas generating unit employing the methods (1) to (3) described above may be additionally added to the UFB generating apparatus 1 in FIG. 1.

Next, a dissolving method for the generated ozone gas is described. A method appropriate for dissolving an ozone gas into the liquid W includes an "air bubble dissolution method", a "membrane contactor dissolution method", and a "filled-layer dissolution method" in addition to the pressurized dissolution method illustrated in FIGS. 3A and 3B. The above three methods are compared with each other and described below in sequence.

(i) Air Bubble Dissolution Method

This is a method of mixing an ozone gas into the liquid W as bubbles and flowing the ozone gas with the liquid W to dissolve. For example, there are a bubbling method in which an ozone gas is blown from a lower portion of a container retaining the liquid W, an ejector method in which a narrow portion is provided in a part of a piping through which the liquid W flows and an ozone gas is blown into the narrow portion, a method of agitating the liquid W and an ozone gas by a pump, and the like. The air bubble dissolution method is a relatively compact dissolution method and is used in a water treatment plant and the like.

(ii) Membrane Contactor Dissolution Method

This is a method of absorbing and dissolving an ozone gas into the liquid W by flowing the liquid W through a porous Teflon (registered trademark) membrane while the ozone gas is flowed through the outside.

(iii) Filled-Layer Dissolution Method

This is a method of dissolving an ozone gas into the liquid W in a filled-layer by making counterflow of the ozone gas and the liquid by flowing the liquid W from the top of the filled-layer while flowing the ozone gas from the bottom.

Note that, in a case of employing the methods (i) to (iii) described above, the dissolving unit 200 of the UFB generating apparatus 1 may be changed from the one with the configuration illustrated in FIGS. 3A and 3B to the one with the configuration employing any one of the methods (i) to (iii).

Particularly, in terms of the severe toxicity, purchase and usage of an ozone gas with high purity with a gas cylinder are limited unless a special environment is prepared. For this reason, it is difficult to generate ozone microbubbles and ultra-fine bubbles by conventional generating methods for microbubbles or ultra-fine bubbles by gas introduction (for example, a Venturi method, a swirl flow method, a pressurized dissolution method, and so on).

On the other hand, as a method of generating ozone dissolving water, a method of generating ozone from oxygen supplied by the above-described electric discharge method, electrolytic method, or ultraviolet lamp method and dissolving the ozone into the water or the like concurrently is useful from the points of the safety and the handleability.

However, in cases of a cavitation method and the like, although it is possible to generate ozone ultra-fine bubbles based on the ozone dissolving water, there are still problems such as an increase in size of the apparatus and the difficulty in increasing the concentration of the ozone ultra-fine bubbles.

In contrast, the T-UFB generating method can be said to be better than the other methods in that it is possible to generate highly concentrated ozone ultra-fine bubbles from an ozone dissolving water under a relatively small apparatus.

<<Effects of T-UFB Generating Method>>

Next, the characteristics and the effects of the above-described T-UFB generating method are described by comparing with a conventional UFB generating method. For example, in a conventional air bubble generating apparatus as represented by the Venturi method, a mechanical depressurizing structure such as a depressurizing nozzle is provided in a part of a flow passage. Then, a liquid is flowed at a predetermined pressure to pass through the depressurizing structure, and thus air bubbles of various sizes are generated in a downstream region of the depressurizing structure.

In this case, among the generated air bubbles, since the bubbles of relatively large size such as milli-bubbles and microbubbles are affected by the buoyancy, such bubbles rise to the liquid surface and disappear in time. Additionally, even the UFBs that are not affected by the buoyancy disappear with the milli-bubbles and microbubbles since the gas-liquid interface energy of the UFBs is not very large. Moreover, even if the above-described depressurizing structures are arranged in series, and the same liquid is flowed through the depressurizing structures repeatedly, it is impossible to store for a long period of time the UFBs of the number corresponding to the number of repetitions. That is, it has been difficult for the UFB-containing liquid generated by the conventional UFB generating method to maintain the concentration of the contained UFBs at a predetermined value for a long period of time.

In contrast, in the T-UFB generating method of the present embodiment using the film boiling, a rapid temperature change from normal temperature to about 300° C. and a rapid pressure change from normal pressure to around a several megapascal occur locally in a part extremely close to the heating element. The heating element has a rectangular shape having one side of around several tens to hundreds of μm. It is around $\frac{1}{10}$ to $\frac{1}{1000}$ of the size of a conventional UFB generator. In addition, with the gas-dissolved liquid within an extremely thin film region of the film boiling bubble surface exceeding the thermal dissolution limit or the pressure dissolution limit instantaneously (in an extremely short time equal to or under microseconds), the phase transition occurs and the gas-dissolved liquid is precipitated as the UFBs. In this case, the bubbles of relatively large size such as milli-bubbles and microbubbles are hardly generated, and the liquid contains the UFBs of about 100 nm in diameter with extremely high purity. Moreover, since the T-UFBs generated in this way have sufficiently large gas-liquid interface energy, the T-UFBs are not broken easily under the normal environment and can be stored for a long period of time.

Particularly, in the present embodiment using the film boiling phenomenon that can form a gas interface locally in the liquid, an interface can be formed in a part of the liquid without affecting the entire liquid region, and a region accordingly affected by heat and pressure can be within an extremely local range. As a result, it is possible to stably generate desired UFBs. Additionally, with further more conditions for generating the UFBs applied to the generated liquid by circulating the liquid, it is possible to additionally generate new UFBs with small effects on the already-made UFBs. As a result, it is possible to produce a UFB liquid of a desired size and concentration relatively easily.

Furthermore, since the T-UFB generating method has the above-described hysteresis properties, the contained concentration can be increased to a desired concentration while keeping the high purity. That is, according to the T-UFB generating method, it is possible to efficiently generate a long-time storable UFB-containing liquid with high purity and high concentration.

In the present embodiment, the T-UFB-containing liquid created by the above-described method is used as a culture medium of a cell. The cell culture using the T-UFB-containing liquid is specifically described below using some examples.

Example 1

Figure 12A:
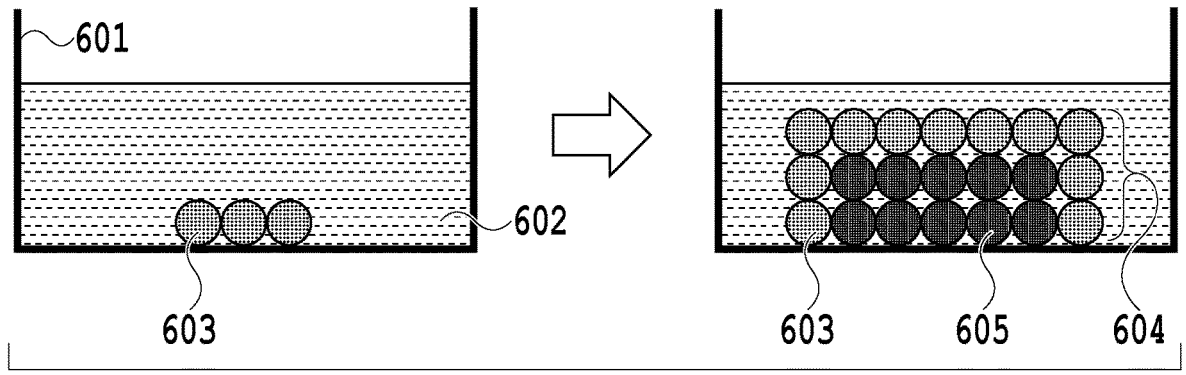
FIGS. 12A to 12C are diagrams illustrating a first example of a first embodiment and a comparative examples together.
Figure 12B:
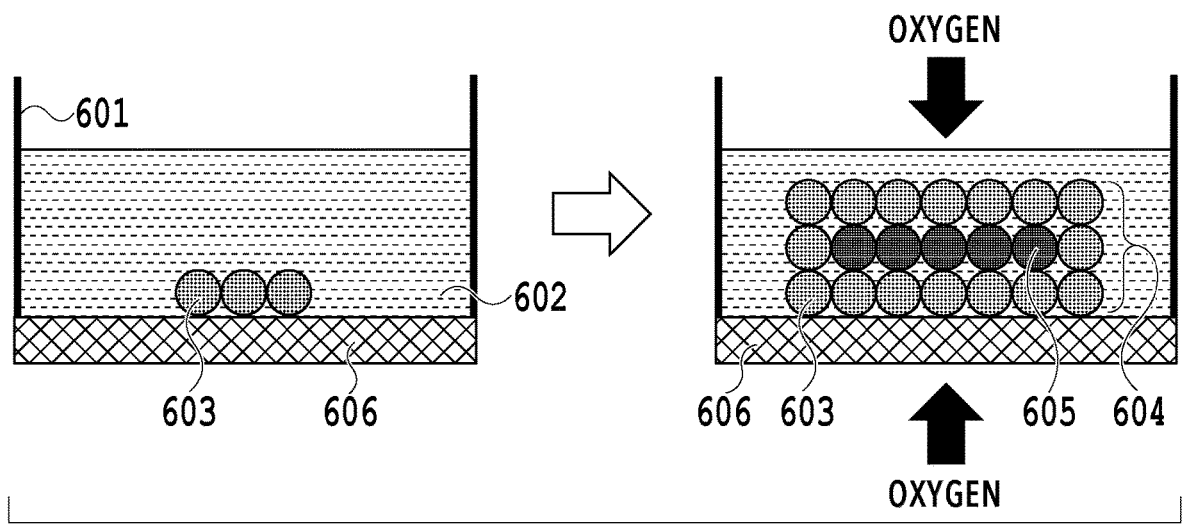
Figure 12C:
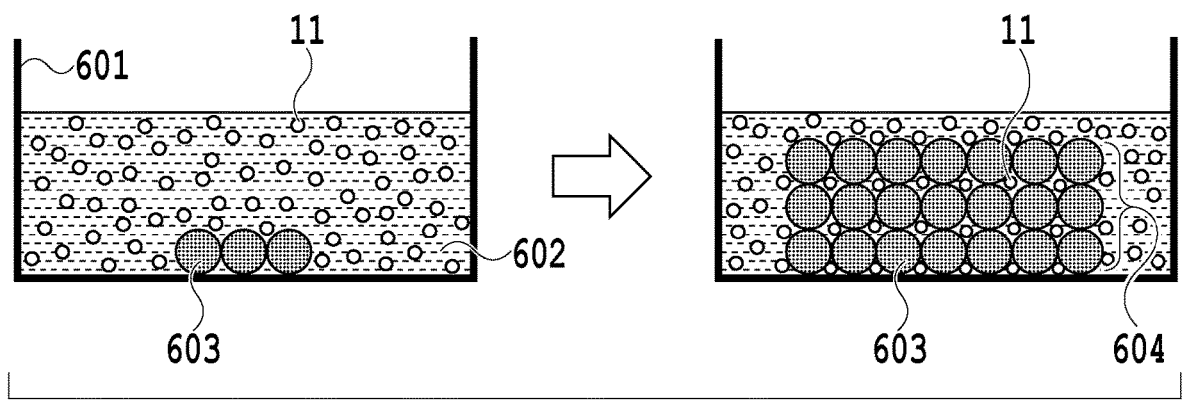

FIGS. 12A to 12C are diagrams illustrating a state in which a spheroid is cultured by using the T-UFB-containing liquid of the present embodiment with a comparative examples. Any of FIGS. 12A to 12C illustrate a state in which a culture medium 602 is retained in a culture container 601 such as a dish and a single cell 603 of a human cell is immersed therein and left for a certain period under a predetermined temperature and humidity.

The diameter of the single cell 603 is about 1 to 100 As the culture medium 602, it is favorable that a liquid medium is included. Additionally, it is favorable for the liquid medium to include amino acids, inorganic salts, and vitamins. As the liquid medium, "StemFit (registered trademark)" AK03 medium (manufactured by Ajinomoto Co., Inc.) based on amino acid, DMEM (manufactured by FUJIFILM Wako Pure Chemical Corporation), and the like are usable. Additionally, it is favorable for the culture medium 602 to include animal serum. Moreover, it is favorable for the culture medium 602 to include antibiotic. As the animal serum and antibiotic, publicly known animal serum and antibiotic are usable. If the culture medium contains oxygen UFBs, the dissolved oxygen in the culture medium is favorably in a supersaturated state. Additionally, the dissolved oxygen concentration in the culture medium is favorably 8.0 ppm or higher. Note that, the dissolved oxygen in the culture medium is measurable by a dissolved oxygen concentration meter (optical dissolved oxygen concentration meter, FDO Multi3510 type (WTW (manufactured by WTW GmbH))). Usually, the cell culture is often conducted under a temperature as much as the body temperature of human (about 37° C.). In order to measure the dissolved oxygen concentration in an incubator for culture, an optical type that is portable type and can measure with a small amount was selected. As the dissolved oxygen concentration meter (DO Meter), a galvanic type (diaphragm electrode type) and the like can also be used.

FIG. 12A illustrates a case of using the general culture container 601 and culture medium 602. The single cell 603 grows while absorbing nutrients and oxygen from the culture medium 602 and forms a spheroid 604 that is a three-dimensional cell. However, once the spheroid 604 reaches a certain size, a cell inside, which is not easily in contact with the culture medium 602, tends to be not sufficiently supplied with oxygen necessary for growth and to necrotize (necrosis). Such necrosis can be suppressed to some extent by refilling and replacing the culture medium 602 during the culture; however, according to the observation by the present inventor, even if the culture medium 602 is replaced at least every 12 hours, a necrotized cell 605 is generated after a certain period of time.

FIG. 12B illustrates an example where a bottom portion of the culture container 601 is formed of a material with high oxygen permeability. Such a material includes, for example, a gas-liquid separating membrane such as a silicone hollow fiber separating membrane (NAGASEP: manufactured by NAGAYANAGI CO., LTD.) and polydimethylsiloxane (PDMS).

In this case, as compared with FIG. 12A, the area of the culture medium 602 exposed to the atmospheric air is increased, and each cell is supplied with oxygen more easily. However, it is still difficult for a cell positioned near the center of the spheroid 604 to be supplied with sufficient oxygen, and the necrotized cell 605 is generated.

FIG. 12C illustrates a culture method of the present example. In the present example, a solution in which the ultra-fine bubble-containing liquid generated by the UFB generating apparatus 1 and the above-described commercially available culture medium are mixed with each other is used as the culture medium 602. Specifically, in the UFB generating apparatus 1 described in FIG. 1, a gas containing oxygen is dissolved by the dissolving unit 200, and the T-UFBs are generated by the T-UFB generating unit 300. Then, the created T-UFB-containing liquid is mixed into the above-described commercially available culture medium, and the completed mixed liquid is used as the culture medium 602 in the present example.

The size of the UFBs 11 generated by the T-UFB generating is 100 nm or smaller and is sufficiently smaller than the single cell 603 around 1 to 100 For this reason, the UFBs 11 containing oxygen are dispersed uniformly with Brownian motion, and even in a case where the spheroid 604 becomes a clump that is large to some extent, the UFBs 11 can pass through between individual cells and come close to the cell positioned near the center. As a result, almost all the cells forming the spheroid 604 are stably supplied with oxygen, and the spheroid 604 can grow without generating the necrotized cell 605. That is, according to the present example, with a use of the liquid in which the T-UFB-containing liquid generated by the T-UFB generating method is mixed into a commercially available culture medium as the culture medium, it is possible to stably produce a spheroid of a desired size in a state of high reproducibility.

Additionally, according to the present example in which the individual cells are supplied with oxygen more easily, as compared with the comparative examples illustrated in FIGS. 12A and 12B, the frequency of replacement of the culture medium can be reduced. Therefore, manpower can be reduced, and also the stress on the cells from pipette operation and the like is reduced; in terms of the above, efficient generation of three-dimensional cells is also encouraged.

With reference to FIG. 1 again, a specific producing method for a T-UFB-containing liquid usable in the present example is described below. First, in the present example, sterilized purified water (ultrapure water) is used as the liquid W. This is because, with tap water or general pure water, disinfection processing may be insufficient due to contamination and the like, and there is a risk that bacteria such as *Escherichia coli* that damages a cell are mixed and inhibit the cell culture. Specifically, ultrapure water purified by an ultrapure water device (including UV sterilization processing and filter filtration) manufactured by Merck KGaA is favorably usable.

As the gas G to be dissolved, a medical gas is favorable. Specifically, a medical gas that is manufactured by Iwatani Corporation and contains at least oxygen and carbon dioxide can be utilized. In addition to oxygen and carbon dioxide, the gas G may contain nitrogen, hydrogen, neon, ozone, argon, a perfluorocarbon system gas, and the like.

In the T-UFB generating unit 300, it is favorable for the entire unit to be stored in a draft chamber under a sterilized environment. Specifically, cabinet class II (MHE-181AB3) against biohazard manufactured by Panasonic Corporation is favorably usable.

As described above, in the mode in which a T-UFB-containing liquid is generated by the T-UFB generating unit 300 stored in the draft chamber by using the already-manufactured ultrapure water and the medical gas, the whole device can be relatively compact. Additionally, with the generated T-UFB-containing liquid mixed into the above-described commercially available culture medium, the culture medium 602 that is contamination-free and usable in the present example can be generated.

Incidentally, according to the studies by the present inventors, it has been confirmed that the T-UFBs generated by the T-UFB generating method tends to form a floc after being generated. Additionally, it has been also confirmed that such a floc is able to be dispersed by ultrasonic wave applied.

Figure 13:
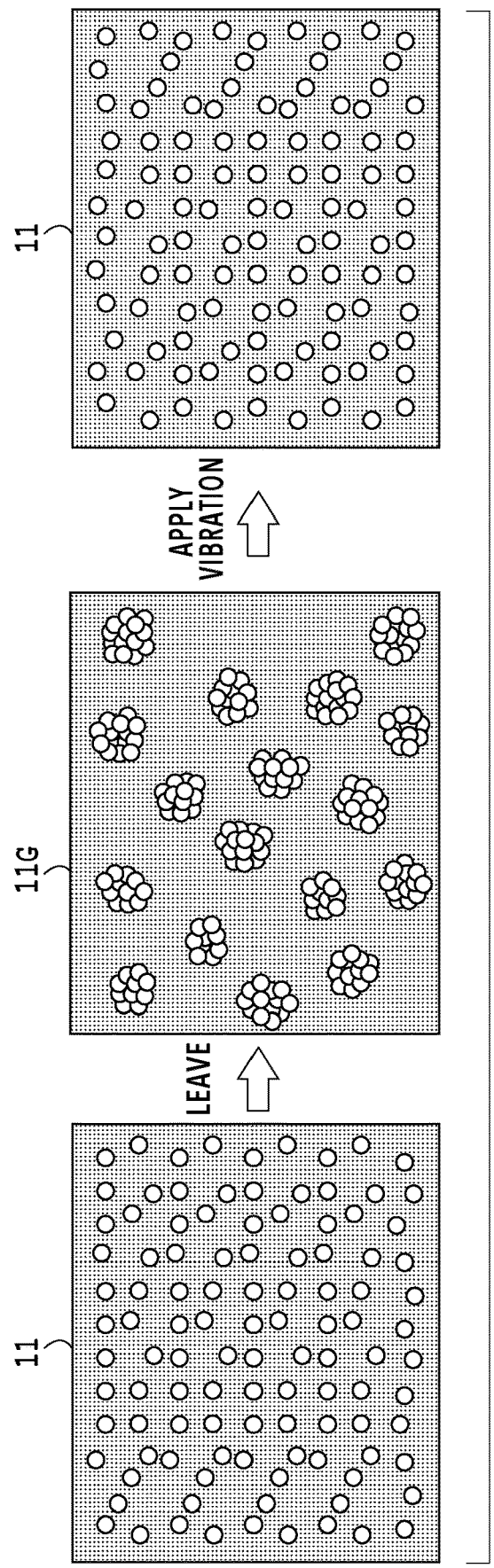
FIG. 13 is a schematic view for describing states of flocculation and dispersion of T-UFB s.

FIG. 13 is a schematic view for describing states of flocculation and dispersion of the T-UFBs. The individual UFBs 11 generated by the T-UFB generating method are fine bubbles of 100 nm or less in diameter that have a zeta potential of ±0 to −30 mV and tend to be flocculated with the other. Accordingly, in the UFB-containing liquid generated by the T-UFB generating method, the formation of a floc 11G is started at a relatively early stage after the UFB generation.

As the number of the UFBs 11 contained in the floc 11G is greater, the negative charge that the floc 11G has is greater. Then, once the diameter of the floc 11G becomes around 100 to 200 nm, the zeta potential that the floc has becomes around −60 to −100 mV, and the flocs 11G repel each other due to electrostatic force. That is, in the T-UFB-containing liquid in which the UFBs are generated by the T-UFB generating method and after being left for a while, multiple flocs 11G of a certain size are in a state of dispersing and floating in the liquid with Brownian motion.

However, a state in which the UFBs 11 float by the unit of the floc 11G is a state in which the number of the UFBs is smaller than the number of the UFBs 11 in actuality, and an effect of supplying a cell near the center of the spheroid 604 with oxygen is reduced. Therefore, in the present example, as post-processing after generating the T-UFBs by the T-UFB generating unit 300, a step of immersing an ultrasonic horn in the T-UFB-containing liquid and oscillating for 30 seconds at 150 KHz and 80 W was added. With this, the floc 11G is dispersed, and the number of the UFBs 11 could be increased in appearance. Then, a solution in which the UFB-containing liquid after being subjected to such post-processing is mixed in the above-described commercially available culture medium was used as the culture medium 602 of the present example. Note that, the vibration number of the above-described vibration is changeable depending on the state as a matter of course. According to the studies by the present inventors, it has been confirmed that the floc 11G can be dispersed into the individual UFBs 11 with ultrasonic wave included within kHz band width to MHz band width.

Note that, in the present example, whether there is a necrotized cell in a cultured spheroid and the stability of the entire spheroid were confirmed by using a three-dimensional imaging device such as FV3000 manufactured by Olympus Corporation. Additionally, a method of slicing a three-dimensional cell spheroid, staining the torn surface, and evaluating the activation of a cellular tissue was also employed.

Example 2

In Example 2, a case where an organoid is cultured by using the T-UFB-containing liquid of the present embodiment is described.

Figure 14:
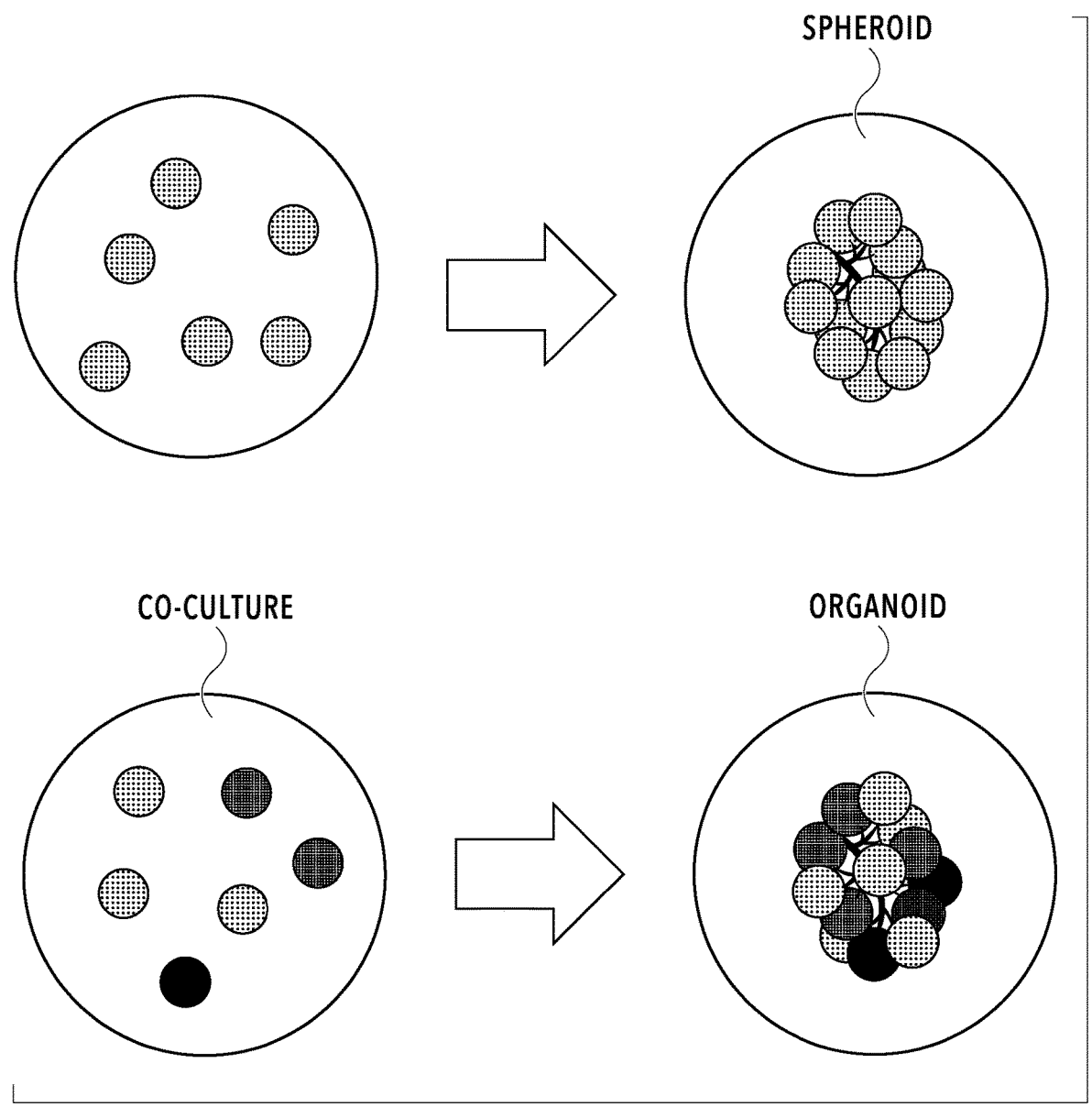
FIG. 14 is a schematic view for describing a difference between a spheroid and an organoid.

FIG. 14 is a schematic view for describing a difference between a spheroid and an organoid. While a spheroid is a three-dimensional cell formed by three-dimensionally culturing a single cell (one type of a single cell), an organoid is a three-dimensional cell formed by three-dimensionally co-culturing two or more types of single cells. A spheroid is a cell aggregation in which one type of multiple cells are connected with each other through blood vessels, and an organoid is a cell aggregation in which multiple types of multiple cells are connected with each other through blood vessels.

As with a spheroid, the culture of an organoid has a problem with supplying of oxygen to a cell inside the cell aggregation. For an organoid, the three-dimensional culture is required until being close to the size of an organ as a target, that is, until growing to a relatively large size; for this reason, the above-described problem is much more important.

Figure 15:
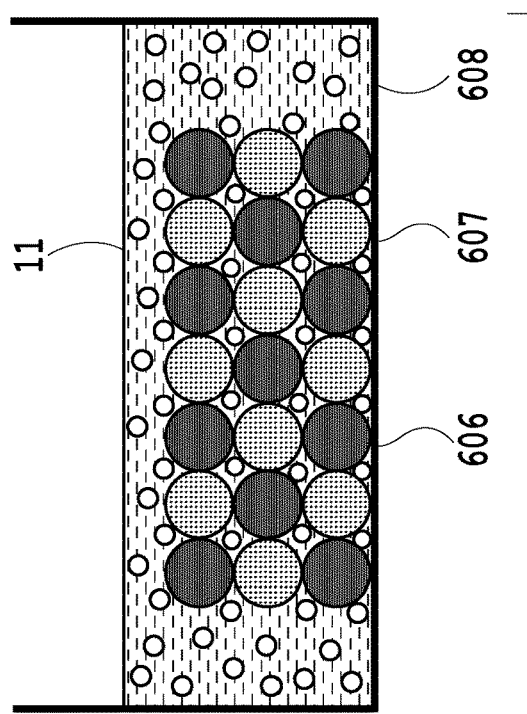
FIG. 15 is a diagram illustrating a second example of the first embodiment.
Figure 15:
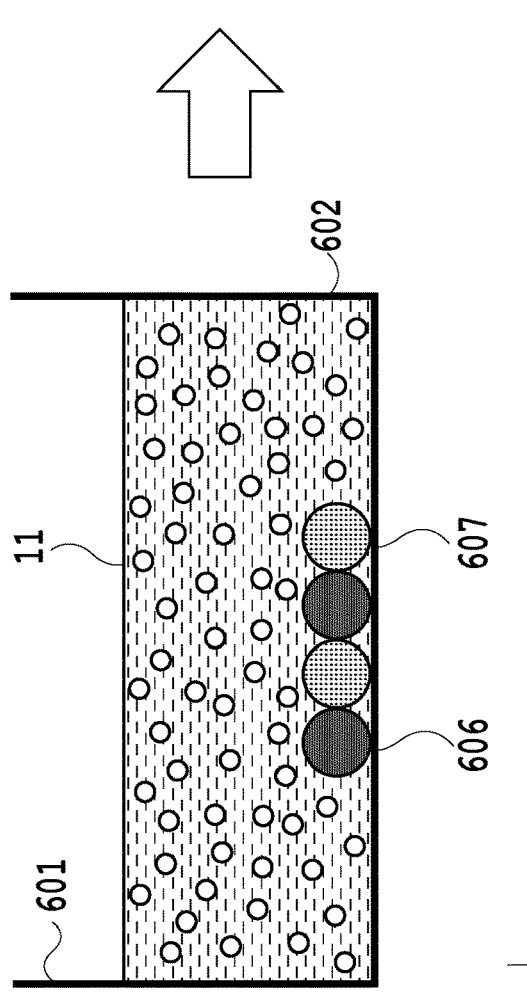

FIG. 15 is a diagram illustrating a state in which the UFB-containing liquid of the present embodiment is used as a culture medium to culture an organoid. As the culture medium 602, a similar solution as that in Example 1 was used. That is, in the UFB generating apparatus 1 illustrated in FIG. 1, ultrapure water was used as the liquid W, a medical gas was dissolved as the gas G, and the T-UFBs were generated by the T-UFB generating unit 300 stored in the draft chamber. Then, a solution, which is made by inserting an ultrasonic horn into the obtained UFB-containing liquid to oscillate for 30 seconds at 100 kHz and 80 W and thereafter mixing the liquid into "StemFit" AK03 medium (manufactured by Ajinomoto Co., Inc.), was applied as the culture medium 602 used in the present example. Then, the culture medium 602 was retained in the culture container 601, and multiple types of human cells 606 and 607 were immersed therein and left for a certain period under an environment keeping a predetermined temperature and humidity.

Also in the present example, the UFBs 11 can pass through between the individual cells 606 and 607 and come close to the cell positioned near the center of an organoid 608. As a result, almost all the cells forming the organoid 608 are stably supplied with oxygen, and the organoid 608 can grow without generating a necrotized cell. According to the observation by the present inventors, no necrotized cell was confirmed even in a case of growing the organoid to a size from 200 μm to 1.0 mm.

That is, according to the present example, with a use of a liquid in which the UFB-containing liquid generated by the T-UFB generating method is mixed in a commercially available culture medium as the culture medium, it is possible to stably produce an organoid in a desired size in a state of high reproducibility.

Example 3

In Example 3, a case where multiple spheroids are cultured at one time by using the T-UFB-containing liquid of the present embodiment is described.

Figure 16:
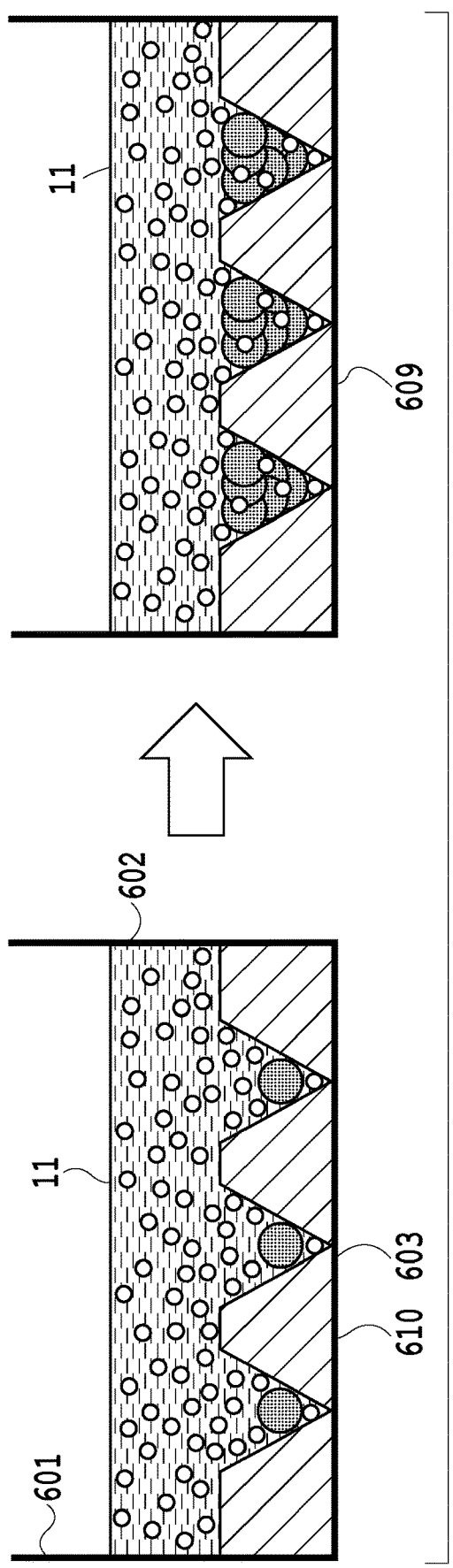
FIG. 16 is a diagram illustrating a third example of the first embodiment.

FIG. 16 is a diagram illustrating a culture method of the present example. A point different from FIG. 12C described in Example 1 is the point that a microplate 610 on which multiple depressed portions are formed is disposed on a bottom portion of the culture container 601. As the culture medium 602, a similar solution as that in Examples 1 and 2 is used. With a single cell arranged in each of the depressed portions, a spheroid can be formed in each of the depressed portions.

Also in the present example, the UFBs 11 containing oxygen are uniformly dispersed and float in the culture container 601. Thus, even in a case where the spheroid 604 reaches a clump that is large to some extent, the UFBs 11 can pass through between the individual cells and come close to a cell near the center. As a result, almost all the cells forming each spheroid 609 are stably supplied with oxygen, and any spheroid 609 can grow normally and equally without including the necrotized cell 605. That is, according to the present example, with a use of a liquid in which the T-UFB-containing liquid generated by the T-UFB generating method is mixed in a commercially available culture medium as the culture medium, it is possible to efficiently produce a large amount of multiple spheroids in a desired size.

Note that, in the first to third examples described above, the culture medium used for the culture of a spheroid or an organoid is obtained by mixing the T-UFB-containing liquid generated by the T-UFB generating unit in a commercially available culture medium; however, the generating method for the culture medium 602 is not limited thereto. In the UFB generating apparatus 1 described in FIG. 1, the liquid W supplied to the pre-processing unit 100 or the dissolving unit 200 may be a commercially available culture medium. In this case, in the T-UFB generating unit 300, film boiling is made in the commercially available culture medium to generate T-UFBs. In any case, as long as it is a liquid that contains nutrients required to culture a cell and the T-UFBs generated by the T-UFB generating method, any liquid can be seen as the culture medium of the present embodiment.

Additionally, in the culture process, it is unnecessary to use the culture medium of the present embodiment containing the T-UFBs all of the time until a single cell grows to a three-dimensional cell in a desired size. The culture medium of the present embodiment may be used only in a period that particularly requires oxygen within a predetermined culture process and may be switched to a conventional culture medium at a stage where the three-dimensional cell is grown to some extent.

Second Embodiment

Figure 17:
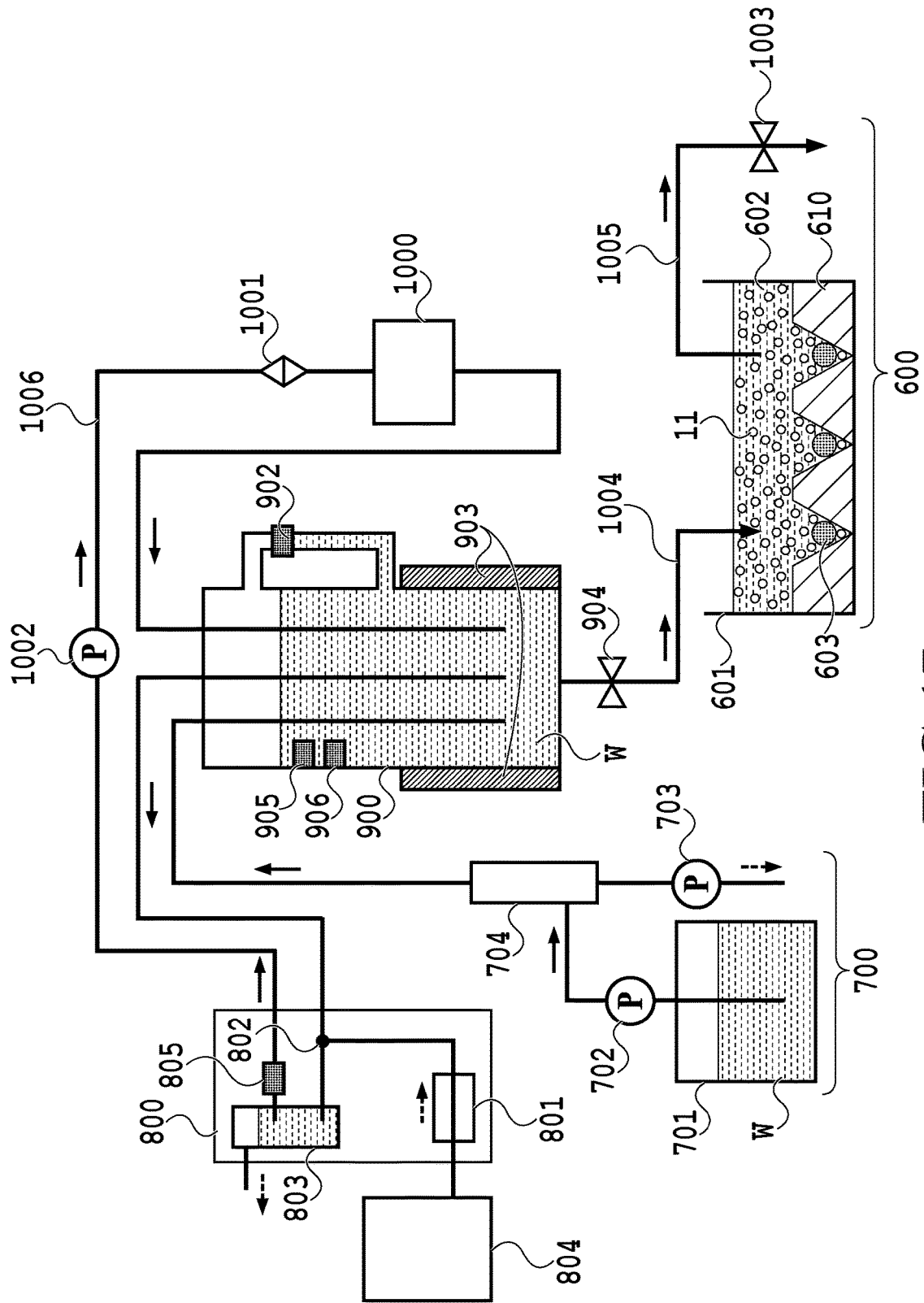
FIG. 17 is a schematic configuration view of a culture device used in a second embodiment.

FIG. 17 is a schematic configuration view of a culture device 2000 used in the present embodiment. The culture device 2000 of the present embodiment mainly includes a liquid supplying unit 700, a gas dissolving unit 800, a storing chamber 900, an ultra-fine bubble generating unit (UFB generating unit) 1000, and a culturing unit 600. The liquid supplying unit 700, the gas dissolving unit 800, and the UFB generating unit 1000 correspond to the pre-processing unit 100, the dissolving unit 200, and the T-UFB generating unit 300 in FIG. 1 described in the first embodiment, respectively. The units are connected with each other by a piping 1006, and the liquid W is circulated by a pump 1002 arranged in the middle of the piping 1006. In FIG. 17, a solid line arrow indicates a flow of a liquid, and a broken line arrow indicates a flow of a gas.

The liquid supplying unit 700 includes a liquid retaining unit 701, pumps 702 and 703, and a degassing unit 704. In the liquid retaining unit 701, a commercially available culture medium is retained. As this culture medium, for example, "StemFit" AK03 medium (manufactured by Ajinomoto Co., Inc.) can be favorably used. The liquid W retained in the liquid retaining unit 701 is transferred to the storing chamber 900 by the pumps 702 and 703 by way of the degassing unit 704. In the inside of the degassing unit 704, a film that allows the gas to pass therethrough but not the liquid is arranged. With only the gas passing through the film by pressures of the pumps 702 and 703, the gas and the liquid are separated from each other, and the liquid W moves toward the storing chamber 900 while the gas is ejected to the outside.

The gas dissolving unit 800 includes a gas supplying unit 804, a pre-processing unit 801, a converging unit 802, and a gas-liquid separating chamber 803. The gas supplying unit 804 may be a cylinder of a medical gas used in the first embodiment or may be a device capable of continuously generating the gas G containing oxygen. For example, the gas supplying unit 804 may be a device that takes in the atmospheric air, removes nitrogen, and continuously transfers the gas with increased oxygen concentration by a pump.

After performing processing such as discharging by the pre-processing unit 801, the gas G supplied by the gas supplying unit 804 converges in the converging unit 802 with the liquid W flowed out from the storing chamber 900. In this process, a part of the gas G is dissolved into the liquid W. The converged gas G and the liquid W are separated again by the gas-liquid separating chamber 803, and only the gas G that is not dissolved into the liquid W is ejected to the outside. The liquid W in which the gas G is dissolved is transferred to the UFB generating unit 1000 by the pump 1002 thereafter. A solubility sensor 805 for detecting the solubility of the gas G in the liquid W is provided downstream of the gas-liquid separating chamber 803.

The UFB generating unit 1000 generates UFBs in the liquid W flowed therein. The T-UFB generating method described using FIG. 4 to FIG. 10 is employed as the generating method for the UFBs. A filter 1001 is arranged upstream the UFB generating unit 1000 to prevent impurities and dust from flowing into the UFB generating unit 1000. With impurities and dust removed, the UFB generating efficiency in the UFB generating unit 1000 can be improved. The UFB-containing liquid W generated in the UFB generating unit 1000 is stored in the storing chamber 900 through the piping 1006.

The storing chamber 900 stores a mixed liquid of the liquid W supplied from the liquid supplying unit 700, the liquid W in which the desired gas G is dissolved by the gas dissolving unit 800, and the UFB-containing liquid in which the T-UFBs are generated by the UFB generating unit 1000.

A temperature sensor 905 detects the temperature of the liquid stored in the storing chamber 900. A liquid surface sensor 902 is arranged at a predetermined height of the storing chamber 900 and detects a liquid surface of the liquid W in the storing chamber 900. A UFB concentration sensor 906 detects the UFB concentration of the liquid W stored in the storing chamber 900. A valve 904 is opened while the liquid W stored in the storing chamber 900 is supplied to the culture container 601.

A temperature adjusting unit 903 manages the temperature of the liquid W stored in the storing chamber 900. In the dissolution of the desired gas G by the gas dissolving unit 800, it is more efficient with the temperature of the liquid W supplied to the gas dissolving unit 800 set as low as possible. On the other hand, while the liquid W retained in the storing chamber 900 is supplied to the culture container 601, it is favorable to adjust the liquid W to a temperature appropriate for the culture. In the present embodiment, while the temperature of the liquid is detected by the temperature sensor 905, the temperature adjusting unit 903 is used to appropriately adjust the temperature of the liquid W while being supplied to the gas dissolving unit 800 and the temperature of the liquid while being supplied to the culture container 601 depending on the scene.

Although it is not illustrated in FIG. 17, in the inside of the storing chamber 900, an ultrasonic horn as described in the first embodiment may be arranged to apply vibration to the liquid before being transferred to the culture container 601 from the storing chamber 900. Additionally, in the storing chamber 900, an agitating means for making the temperature of the liquid W and the distribution of the UFBs uniform may be provided.

The culturing unit 600 mainly includes the culture container 601, an inlet tube 1004, and an outlet tube 1005. In the culture container 601, the microplate 610 described in Example 3 of the first embodiment is set, and a spheroid or an organoid is cultured in each of the depressed portions. Although three depressed portions are illustrated in FIG. 17, many more depressed portions are formed on the microplate 610, and many spheroids are culturable concurrently. A UFB-containing liquid stored in the storing chamber 900 is supplied to the culture container 601 through the inlet tube 1004 continuously or as needed and is ejected from the culture container 601 through the outlet tube 1005 continuously or as needed.

In the UFB-containing liquid (culture medium) stored in the culture container 601, oxygen is consumed along with respiration and growth of a cell; however, with the culture device of the present embodiment, the UFB-containing liquid at an appropriate UFB concentration can be continuously supplied to the culture container 601. That is, replacement of the culture medium by human hand is unnecessary, and it is possible to leave the culture medium under a predetermined environment until a spheroid is grown to a desired size.

Note that, in the present embodiment, the method of flowing the culture medium 602 into and out of the culture container 601 is not particularly limited. A pump may be used, or a water head difference and the like may be used. In any case, it is favorable to adjust the flow to a flow velocity that is slow to the extent that a cell arranged in the culture container 601 is not damaged.

It is favorable for a member that is put in contact with the liquid W as the culture medium such as the piping 1006, the pump 1002, the filter 1001, the storing chamber 900, and a wetted portion of the UFB generating unit 1000 to be formed of a material with strong resistance to corrosion. For example, fluorine system resin such as polytetrafluoroethylene (PTFE) and perfluoroalkoxy alkane (PFA), metal such as SUS316L, and other inorganic materials are favorably usable.

In the circulation route of the present embodiment illustrated in FIG. 17, the step of dissolving the desired gas G and the step of generating the UFBs may be performed concurrently or may be performed separately. In a case of performing the steps concurrently, the liquid is circulated while operating the gas dissolving unit 800 and the UFB generating unit 1000 together. In this process, the valve 904 may be opened during the circulation, or may be in the mode in which, after multiple times of circulation, the valve 904 is opened once a UFB concentration sensor detects an appropriate UFB concentration and transfers an appropriate amount of the UFB-containing liquid to the culturing unit 600.

On the other hand, in a case where the step of dissolving the desired gas G and the step of generating the UFBs are performed separately, after the circulation in which only the gas dissolving unit 800 is operated is performed, the circulation in which only the UFB generating unit 1000 is operated may be performed. In this case, in the circulation in which only the gas dissolving unit 800 is operated, once the solubility sensor 805 detects an appropriate solubility, the gas dissolving unit 800 may be stopped and the operation of the UFB generating unit 1000 may be started. Then, once the UFB concentration sensor 906 detects an appropriate UFB concentration, the valve 904 may be opened and the liquid may be supplied to the culturing unit 600.

Additionally, in FIG. 17, the mode in which a commercially available culture medium is retained in the liquid retaining unit 701 and the T-UFBs are generated in this culture medium is applied; however, the culture medium to be supplied to the culture container 601 may be created by the method described in the first embodiment. Specifically, ultrapure water may be retained in the liquid retaining unit 701, and a mixing unit for mixing a commercially available culture medium and the UFB-containing liquid W may be provided between the storing chamber 900 and the culturing unit 600. Moreover, such a mixing unit may be provided between the gas dissolving unit 800 and the UFB generating unit 1000 or between the UFB generating unit 1000 and the storing chamber 900.

Figure 18:
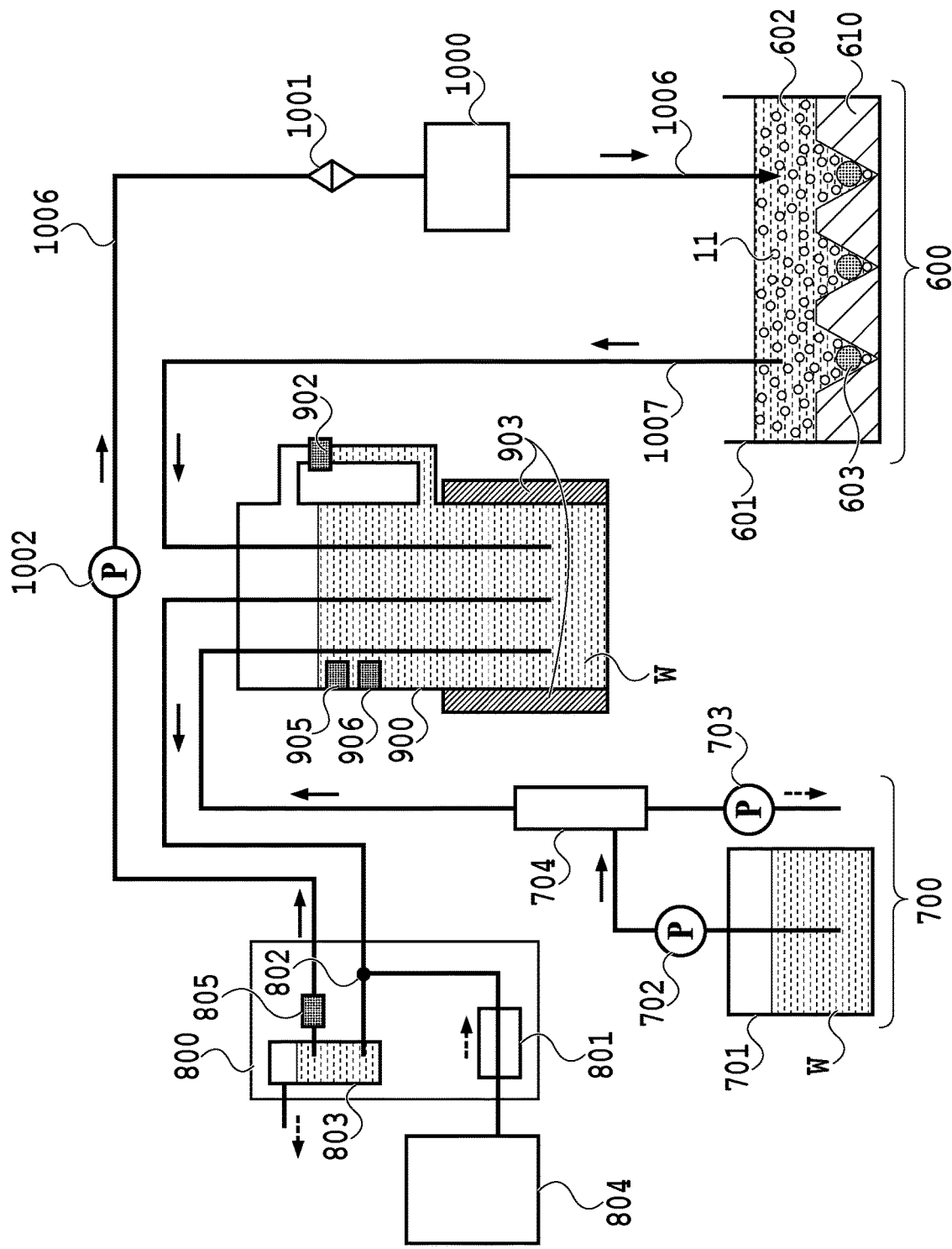
FIG. 18 is a diagram illustrating a modification of the culture device used in the second embodiment.

FIG. 18 is a diagram illustrating a modification of the culture device. A point different from the culture device 2000 illustrated in FIG. 17 is that the culturing unit 600 is arranged in the middle of the circulation route that is, specifically, between the UFB generating unit 1000 and the storing chamber 900. In a case of the present modification, the liquid W stored in the storing chamber 900 returns to the storing chamber 900 again by way of the gas dissolving unit 800, the UFB generating unit 1000, and the culturing unit 600.

Since the spheroid during the culture consumes oxygen in the culturing unit 600, the UFB concentration of the liquid W transferred from the culturing unit 600 is expected to be reduced from the UFB concentration of the liquid W to be supplied to the culturing unit 600. With such a liquid W circulated again through the route including the gas dissolving unit 800 and the UFB generating unit 1000, the concentration of the oxygen UFBs in the liquid W can be improved again. As a result, it is possible to constantly supply a culture medium at an appropriate UFB concentration to the culturing unit 600.

As described above, according to the culture device of the present embodiment that transfers the liquid between the gas dissolving unit 800, the UFB generating unit 1000, and the culturing unit 600, it is possible to efficiently produce a large amount of three-dimensional cells in a desired size.

Third Embodiment

With a use of the T-UFB-containing liquid also in the culture of a two-dimensional cell in addition to the culture of a three-dimensional cell indicated in the above-described first and second embodiments, the two-dimensional cell can be efficiently produced in a large amount. As the UFB generating apparatus and the T-UFB generating method, similar ones as that in the above-described first and second embodiment can be used.

The two-dimensional cell culture using the T-UFB-containing liquid is specifically described below using some examples.

Example 4

The two-dimensional culture of a fibroblast included in the dermis of skin is described below. First, the culture medium (medium) is produced by adding to DMEM (manufactured by FUJIFILM Wako Pure Chemical Corporation), which is a liquid medium containing phenol red (PR), an animal serum (FBS: manufactured by BioWest) of 10% by mass based on the content of DMEM and a penicillin-streptomycin solution (antibiotic: manufactured by FUJIFILM Wako Pure Chemical Corporation) of 1% by mass based on the content of DMEM. This culture medium was put in a general-purpose T type flask, and next, 1,000 pieces of fibroblasts were put therein, and the number of living cells was increased by a carbon dioxide incubator (passaging step). In the carbon dioxide incubator, it is 37° C. that is a temperature appropriate for the cell culture, the humidity is set to 90 to 100% to prevent evaporation of the medium, and it is under carbon dioxide 5% atmosphere for pH adjustment. With such cell culture performed, the number of the cells is increased to about 10,000 pieces in about a week.

Next, the cells in the T type flask were gathered, put into a multiwell plate by 1,000 pieces, and put into the carbon dioxide incubator, and the two-dimensional culture of the cells was conducted for about a week under the same conditions described above.

With the two-dimensional culture as described above conducted, a cell in the form of a sheet is formed. The number of the cells were about 10,000 pieces.

Next, a culture medium containing the oxygen UFBs of the present invention was produced additionally by the following method.

The culture medium (DMEM, FBS 10% by mass, penicillin-streptomycin solution 1% by mass) was allowed to contain the oxygen UFBs (UFB concentration: 1.0 billion pieces/ml). Then, the fibroblasts were increased by the carbon dioxide incubator as described above. As a result, the number reached 10,000 pieces in about two days. It is inferred that it is a result of the dissolved oxygen concentration in the culture medium being maintained in a supersaturated state (10 ppm) for two days, and the cells in the carbon dioxide incubator being continuously supplied with oxygen constantly.

Example 5

As described above, the cells in the T type flask were gathered, the fibroblast were put into a multiwell plate by 1,000 pieces, and the two-dimensional culture was conducted by the carbon dioxide incubator. In this process, the culture medium was allowed to contain the oxygen UFBs (UFB concentration: 1.0 billion pieces/ml). As a result, 10,000 pieces of cells in the form of a sheet were formed in two days. As with the above description, it is inferred that it is a result of the dissolved oxygen concentration in the culture medium being maintained in a supersaturated state (10 ppm) for two days, and the cells in the carbon dioxide incubator being continuously supplied with oxygen constantly.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A method for producing a culture medium used to culture a cell, comprising:
    an ultra-fine bubble generating step to generate an ultra-fine bubble in a liquid by heating a heating element to make film boiling on an interface between the liquid and the heating element; and
    a mixing step to generate the culture medium by mixing an ultra-fine bubble-containing liquid containing the ultra-fine bubble generated by the ultra-fine bubble generating step and a liquid containing a predetermined nutrient with each other.

2. The method according to claim 1, wherein the liquid used in the ultra-fine bubble generating step is purified water subjected to sterilization processing.

3. The method according to claim 1, further comprising:
   a gas dissolving step to dissolve a predetermined gas into the liquid before the ultra-fine bubble generating step.

4. The method according to claim 3, wherein the predetermined gas is a medical gas.

5. The method according to claim 3, wherein the predetermined gas contains oxygen.

6. The method according to claim 1, further comprising:
   a vibrating step to apply vibration to the ultra-fine bubble-containing liquid after the ultra-fine bubble generating step.

7. The method according to claim 6, wherein the vibration is an ultrasonic wave included within kHz band width to MHz band width.

8. The method for producing a culture medium according to claim 1, wherein the ultra-fine bubble contains oxygen.

9. The method for producing a culture medium according to claim 1, wherein the cell is a three-dimensional cell that is at least one selected from the group consisting of a spheroid and an organoid.

10. A method for producing a culture medium used to culture a cell, comprising:
    an ultra-fine bubble generating step to generate an ultra-fine bubble-containing liquid by generating an ultra-fine bubble in a liquid containing a predetermined nutrient by heating a heating element to make film boiling on an interface between the liquid and the heating element.

\* \* \* \* \*